United States Patent [19]
Koizumi et al.

[11] Patent Number: 5,872,999
[45] Date of Patent: *Feb. 16, 1999

[54] SYSTEM FOR PERIPHERAL IDENTIFICATION OBTAINED BY CALCULATION AND MANIPULATION DATA COLLECTING FOR DETERMINING COMMUNICATION MODE AND COLLECTING DATA FROM FIRST TERMINAL CONTACTS

[75] Inventors: Masahiro Koizumi; Naoki Niizuma; Yasuhisa Kawase; Hamjime Ikebe, all of Tokyo, Japan

[73] Assignee: Sega Enterprises, Ltd., Tokyo, Japan

[ * ] Notice: The term of this patent shall not extend beyond the expiration date of Pat. No. 5,630,170.

[21] Appl. No.: 663,215

[22] PCT Filed: Oct. 11, 1995

[86] PCT No.: PCT/JP95/02073

§ 371 Date: Sep. 30, 1996

§ 102(e) Date: Sep. 30, 1996

[87] PCT Pub. No.: WO96/12250

PCT Pub. Date: Apr. 25, 1996

Related U.S. Application Data

[63] Continuation-in-part of Ser. No. 445,108, May 19, 1995, Pat. No. 5,630,170.

[30] Foreign Application Priority Data

Oct. 12, 1994 [JP] Japan .................................... 6/246580
Oct. 12, 1994 [JP] Japan .................................... 6/246581

[51] Int. Cl.⁶ .................................................. G06F 13/36
[52] U.S. Cl. ............................... 395/892; 395/893; 463/1
[58] Field of Search .................................... 395/828, 893; 364/410, 284, 240.1, 242.1; 463/1

[56] References Cited

U.S. PATENT DOCUMENTS

4,501,424  2/1985  Stone et al. ......................... 273/148 B
5,059,958  10/1991  Jacobs et al. ........................... 345/158

(List continued on next page.)

FOREIGN PATENT DOCUMENTS

50-72547  6/1975  Japan .
54-76034  6/1979  Japan .

(List continued on next page.)

OTHER PUBLICATIONS

Copy of Office Action ("Notice of Reason for Rejection") of Japanese Patent Office for corresponding application No. Hei 8(1996)–511157 with full translation.

*Primary Examiner*—Thomas C. Lee
*Assistant Examiner*—Anderson I. Chen
*Attorney, Agent, or Firm*—Finnegan, Henderson, Farabow, Garrett & Dunner, L.L.P.

[57] ABSTRACT

A peripheral device for use with a data processing apparatus. The apparatus has a peripheral port with a set of terminal pins consisting of first to ninth pins disposed in a row. The first pin is assigned for one of a power source and the ground potential, the ninth pin for the other of the power source and the ground potential, the second, third, seventh and eighth pins for transmitting data signals, and the fourth to sixth for transmitting control signals. The apparatus has an element for selecting the communication mode of the peripheral device connected to the peripheral port, based on the data signals transmitted from the second, third, seventh and eighth pins. The peripheral device comprises a plug connector detachably connected to the peripheral port, the plug connector having a set of terminal pins consisting of first to ninth pins disposed in a row, a cable including a plurality of wires connecting the terminal pins of the plug connector with terminals on an internal printed circuit board, and an element for transmitting data signals including identification data representing the communication mode via at least one of the second, third, seventh and eighth pins in synchronization with a clock signal supplied from the apparatus.

24 Claims, 19 Drawing Sheets

U.S. PATENT DOCUMENTS

| | | | |
|---|---|---|---|
| 5,394,168 | 2/1995 | Smith, III et al. | 345/156 |
| 5,630,170 | 5/1997 | Koizumi et al. | 395/834 |

FOREIGN PATENT DOCUMENTS

| | | |
|---|---|---|
| 57-189231 | 11/1982 | Japan . |
| 57-196333 | 12/1982 | Japan . |
| 59-140559 | 8/1984 | Japan . |
| 60-62299 | 4/1985 | Japan . |
| 61-99233 | 6/1986 | Japan . |
| 62-11955 | 1/1987 | Japan . |
| 62-256066 | 11/1987 | Japan . |
| 1-65654 | 3/1989 | Japan . |
| 1-128153 | 5/1989 | Japan . |
| 1-84155 | 6/1989 | Japan . |
| 2-7147 | 1/1990 | Japan . |
| 2-62618 | 3/1990 | Japan . |
| 2-219160 | 8/1990 | Japan . |
| 2-228718 | 9/1990 | Japan . |
| 2-281364 | 11/1990 | Japan . |
| 3-103571 | 10/1991 | Japan . |
| 3-104971 | 10/1991 | Japan . |
| 4-97472 | 3/1992 | Japan . |
| 5-134973 | 6/1993 | Japan . |

| Pin | Signal |
|---|---|
| 1 | Vcc |
| 2 | D |
| 3 | U |
| 4 | TH |
| 5 | TR |
| 6 | TL |
| 7 | R |
| 8 | L |
| 9 | GND |

| Pin | Signal |
|---|---|
| 1 | Vcc |
| 2 | D |
| 3 | U |
| 4 | TH |
| 5 | TR |
| 6 | TL |
| 7 | R |
| 8 | L |
| 9 | GND |

| Pin | Signal |
|---|---|
| 1 | Vcc |
| 2 | D |
| 3 | U |
| 4 | TH |
| 5 | TR |
| 6 | TL |
| 7 | R |
| 8 | L |
| 9 | GND |

SYSTEM FOR PERIPHERAL IDENTIFICATION OBTAINED BY CALCULATION AND MANIPULATION DATA COLLECTING FOR DETERMINING COMMUNICATION MODE AND COLLECTING DATA FROM FIRST TERMINAL CONTACTS

CROSS REFERENCE TO RELATED APPLICATIONS

This application is a Continuation-in-part of U.S. application Ser. No. 08/445,108 filed May 19, 1995 now U.S. Pat. No. 5,630,170.

BACKGROUND OF THE INVENTION

1. Field of the Invention

The present invention relates to an improvement in communication between a data processing apparatus and a peripheral device to be connected to the data processing apparatus, and more specifically, to a system for identifying communication modes of the peripheral devices connected to a game apparatus and connector configurations suitable to the peripheral devices with various types of communication modes.

2. Description of Related Art

An image processing system is known as a system which has a display such as a television set, (hereinafter, referred to as a "monitor"), on which images are time-dependently displayed. As is widely known for home use, a game apparatus is one representative of such image processing systems.

The game apparatus comprises a processing unit executing game programs and generating video and audio signals. To the apparatus are connected various types of peripheral devices (frequently, referred to as mere "peripherals") such as manipulating switching assemblies called joy pad, controller, or key board. The processing unit mainly performs not only a predetermined image processing therein but also a variety of processings including control of the peripheral devices. The peripheral devices are used, for example, for inputting necessary information from an operator into the processing unit and for displaying image data such as graphic and character data supplied from the processing unit. The peripheral devices thus typically include an operator controller and a monitor having a screen and speaker.

When the processing unit to which the monitor and operator controller are connected is activated by a player or an operator, the monitor is able to display images on its screen and to produce sound from its speaker, depending on instructions of a given game software sent from the processing unit. The player can enjoy the game with the game apparatus.

The game apparatus is normally required to be able to carry out various games. This means that there is much possibility that various types of peripheral devices are connected to the processing unit.

Various interfaces are arranged between the processing unit and the peripheral devices in aid of communication therebetween. Further, because communication modes are often varied depending on the peripheral device, the processing unit is required to obtain information (peripheral identification data) representing the type of a connected peripheral device. For this requirement, it is proposed that the type of a connected peripheral device can be identified using logical values acquired through data lines of the peripheral device when the processing unit sends twice the peripheral device a peripheral selection signal of logical values of "1" firstly, and then of "0". Such prior art is disclosed in Japanese patent Laid-open No.2-62618, for example.

However, the above identification method identifies in fact only the type of a connected peripheral device on the basis of logical values acquired though data lines of the device. In other words, this identification method does not give attention to the communication mode of a connected peripheral device. This results in a drawback that, frequently, connected peripheral devices cannot send data to the processing unit and also the processing unit cannot control the peripheral devices with preferable communication modes to those peripheral devices.

SUMMARY OF THE INVENTION

Accordingly, an object of the present invention is to make it possible for a data processing apparatus to communicate for data transmission employing various types of communication modes with various peripheral devices.

Another object of the present invention is to provide a data processing apparatus adaptable to various types of communication modes.

Still another object of the present invention is to provide a connector plug configuration, which connects a peripheral device to a data processing apparatus adaptable to various types of peripheral devices.

Still another object of the present invention is to provide a peripheral device having a connector assembly suitable for transmission of control signals and data with a data processing apparatus.

Still another object of the present invention is to provide a data processing apparatus with a system for identifying various types of communication modes of peripheral devices connected to the apparatus.

Still another object of the present invention is to provide a data processing apparatus with a system for controlling various types of peripheral devices connected to the apparatus through a connector with an improved pin configuration.

Still another object of the present invention is to provide a connector used in a peripheral device, the connector incorporating a plug having a terminal pin configuration which efficiently and rapidly transmits to a processing apparatus necessary information in order that the processing apparatus identifies a communication mode inherently given to the peripheral device, thereby a smooth communication being permitted between the processing apparatus and peripheral device on the communication mode.

In order to achieve the objects, according to one aspect of the present invention, there is provided a peripheral device for use with a data processing apparatus, said apparatus having a peripheral port with a set of terminal pins consisting of first to ninth pins and being disposed in a row in the order of the first to the ninth pins, said first pin being assigned for connecting to one of a power source and the ground potential, said ninth pin being assigned for connecting to the other of the power source and the ground potential, said second, third, seventh and eighth pins being assigned for transmitting data signals, said fourth to sixth pins being assigned for transmitting control signals, said apparatus having means for selecting the communication mode for communicating with the peripheral device connected to the peripheral port based on the data signals transmitted from said second, third, seventh and eighth pins, said peripheral device comprising: a plug connector which is to be detachably connected to said peripheral port, said plug connector having a set of terminal pins consisting of first to ninth pins and being disposed in row in the order of the first to the ninth pins correspondingly to said first to ninth pins of the peripheral port; a cable including a plurality of wires connecting the terminal pins of said plug connector with terminals on a printed circuit board of said peripheral device; and means for transmitting data signals including identification data representing the communication mode of said peripheral device via at least one of said second, third, seventh and eighth pins in synchronization with a clock signal supplied from said apparatus when said plug connector is connected to said peripheral port.

According to another aspect of the invention, there is still provided a combination of a data processing apparatus and a peripheral device, comprising: said apparatus having a peripheral port with a plurality of terminal pins disposed in a row, said terminal pins including a pair of first pins, one assigned for connecting to one of a power source and the ground potential and the other assigned for connecting to the other of the power source and the ground potential, at least one of second pins assigned for transmitting data signals, a plurality of third pins assigned for transmitting control signals, said apparatus further having means for selecting the communication mode for communicating with the peripheral device connected to the peripheral port based on the data signals transmitted from said at least one second pin, means for transmitting a clock signal via one of said third pins to said peripheral device and means for performing a communication with the connected peripheral device with the selected communication mode; said peripheral device having a plug connector which is to be detachably connected to said peripheral port, said plug connector having a plurality of terminal pins configured as the same in number as and disposed in a row correspondingly to the terminal pins of said peripheral port, said peripheral device further having a cable including a plurality of wires connecting the terminal pins of said plug connector with terminal on a printed circuit board of said peripheral device and means for transmitting data signals including identification data representing the communication mode of said peripheral device via said at least one of second pin to said apparatus in synchronization with said clock signal when said plug connector is connected to said peripheral port.

BRIEF DESCRIPTION OF THE DRAWINGS

In the drawings:

FIGS. 5A to 5C are pin configurations of plug connectors employed in compliance with typical communication modes;

DETAILED DESCRIPTION OF THE PREFERRED EMBODIMENTS

An embodiment of the present invention will now be explained with reference to FIGS. 1 to 15.

Figure 1:
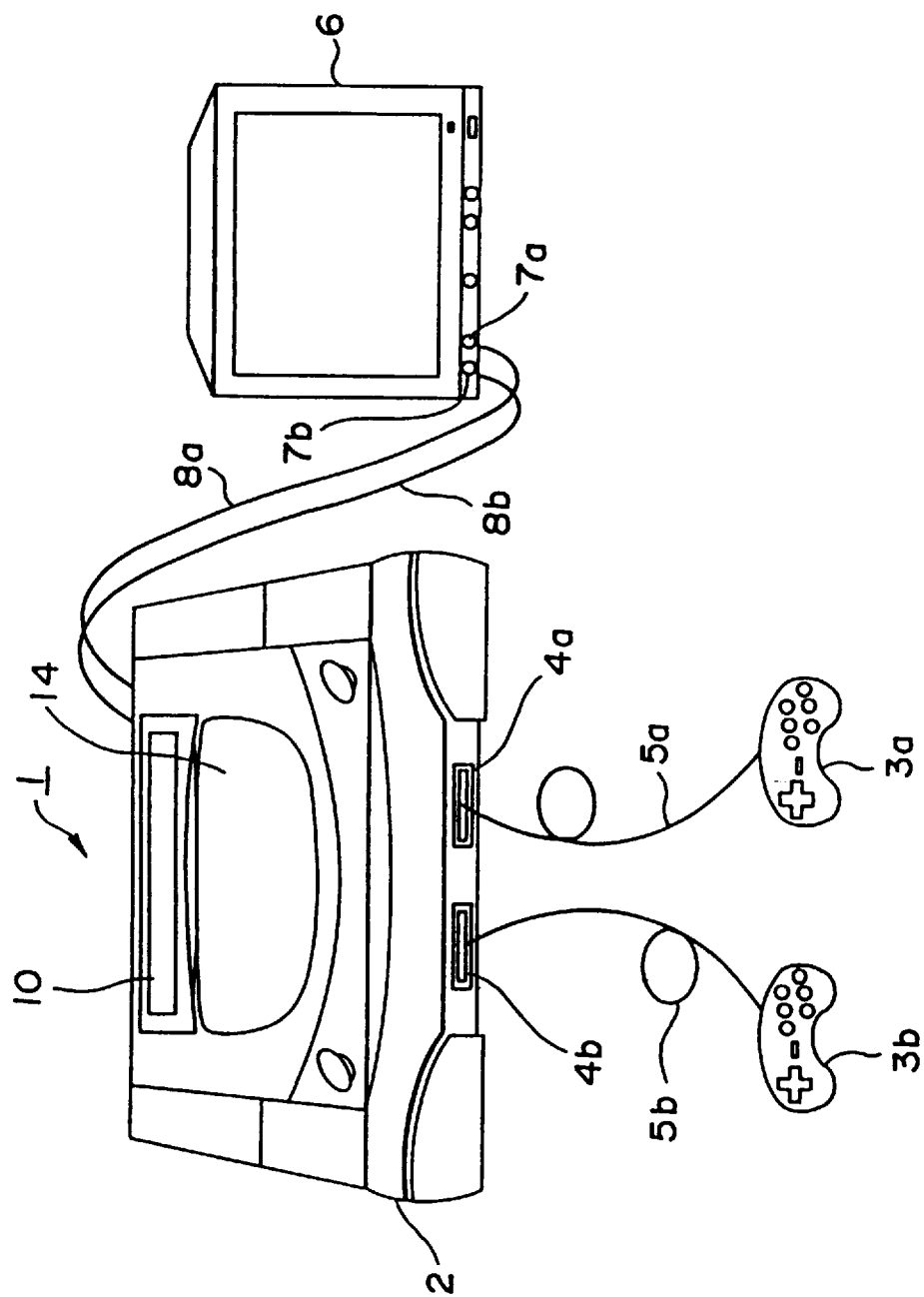
FIG. 1 is a perspective illustration of a game system embodying the present invention.

FIG. 1 shows a perspective view of a game system 1 to which the present invention is applied. The game system 1 comprises a game apparatus 2 functioning as the data processing apparatus for processing game programs and controlling various operations and control switch assemblies or controllers 3a and 3b as an example of peripheral devices to the game apparatus. As for the controllers, such control keys disclosed in U.S. patent application Ser. No. 08/245, 446 may be used. The apparatus 2 is provided with connector ports 4a and 4b for connecting peripheral devices. Each of the connector ports 4a and 4b has a socket or a socket connector 4as(4bs) to which a plug or a plug connector 4ap(4bp) can be connected and disconnected.

The plugs 4ap and 4bp are connected to the controllers 3a and 3b through cables 5a and 5b, respectively. The controllers 3a and 3b are electrically and functionally connected to internal circuits of the game apparatus 2 via the cables 5a and 5b when the plugs 4ap and 4bp are inserted into the sockets 4as and 4bs.

Each of the plugs 4ap and 4bp has a configuration of plug pins which ensures transmission of a communication mode employed for the controllers 3a and 3b to the game apparatus 2. Further, the apparatus 2 comprises a video output terminal and an audio output terminal not shown.

The video output terminal is connected to a video input terminal 7a of a monitor 6, such a television set, through a cable 8a. Also the audio output terminal is connected to an audio input terminal 7b of the monitor 6 through a cable 8b.

The game apparatus 2 has a CD-ROM drive block 14 positioned at the central portion thereof. The CD-ROM drive block 14 is installed with a CD-ROM drive 9 and an optical pickup to read game program data or audio/video software from CD-ROM discs mounted thereto. The apparatus is further provided with a cartridge port 10 positioned at the rear side of the CD-ROM drive block 9. The cartridge port portion 10 is installed therein with a socket connector to which are connected devices such as a ROM/RAM cassette or an optional adapter for providing additional functions (not shown).

The apparatus 2 carries out a wide variety of information processings and controls such as image processings, audio processings and control of peripheral devices as well as processing of game programs. The controllers 3a and 3b provide the apparatus 2 operating signals. A video and audio signals generated by the apparatus 2 are given to the monitor 6 through the cables 8a and 8b.

Figure 2:
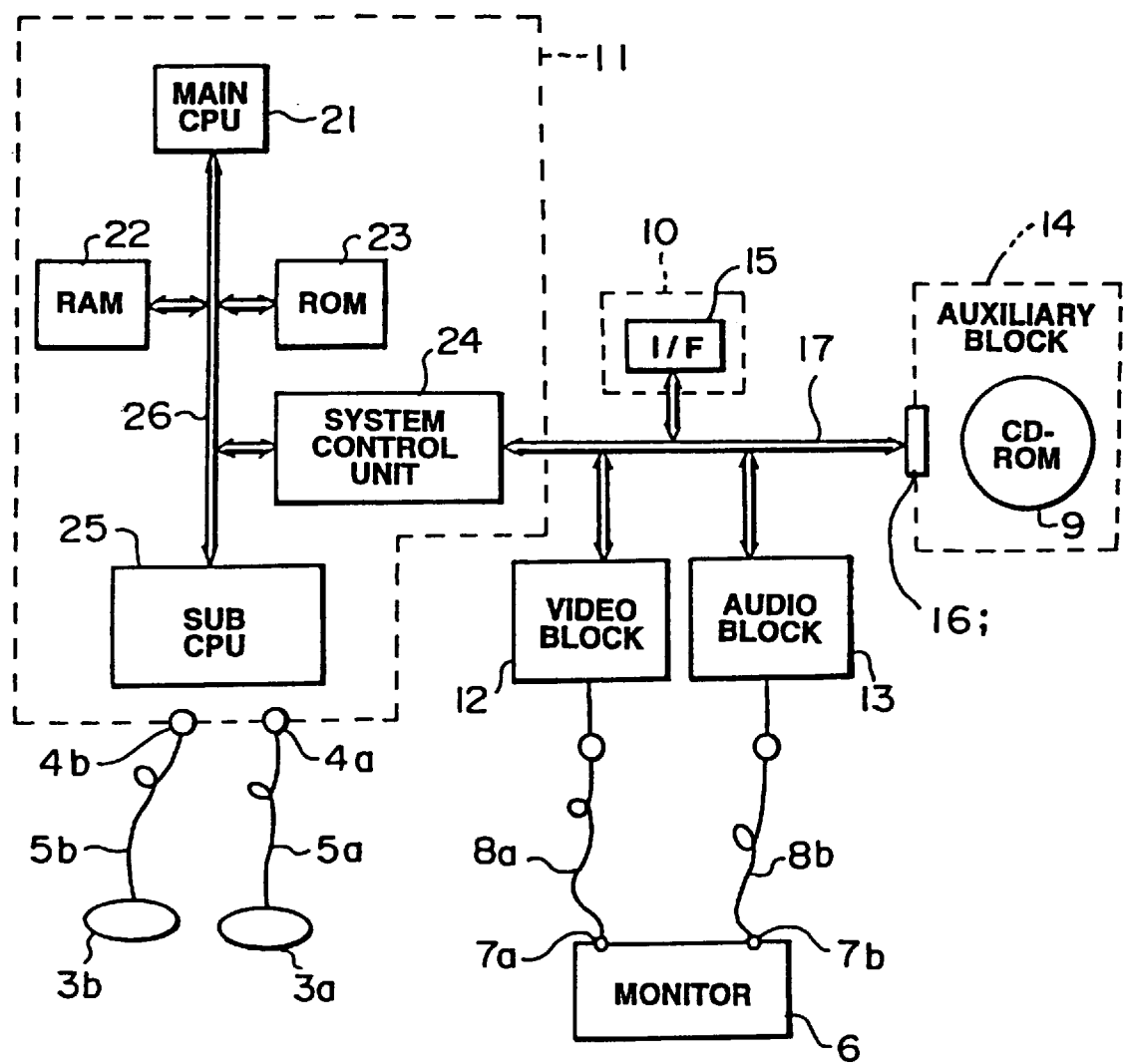
FIG. 2 is a basic block diagram showing the game system.

FIG. 2 exemplifies a block diagram of the game apparatus 2. The apparatus 2 shown therein comprises a processing block 11, video block 12, audio block 13, and auxiliary block or CD-ROM drive block 14. The cartridge port 10 includes a cartridge interface (I/F) 15 and the auxiliary block 14 includes a compact disk interface (I/F) 16.

The processing block 11 comprises a main processing unit (CPU) 21, RAM 22, ROM 23, system control unit 24, and sub CPU 25. The main CPU 21 is functionally connected, via a bus line 26, to the RAM 22, ROM 23, system control unit 24, and sub CPU 25.

Through the bus line 26, system control unit 24 and a bus line 17, the main CPU 21 is functionally connected with the video block 12, audio block 13, cartridge I/F 15, and CD I/F 16. The CD I/F 16 of the auxiliary block 14 is connected with the CD-ROM drive 9.

The main CPU 21 controls the entire processings of the system. In order to enhance control capability, the main CPU 21 consists of 32-bit RISC types high speed CPUs (two CPU chips called SH-2) and provides an improved, high speed calculating operation which may function similarly as a digital signal processor (DSP).

RAM 22 has, for example, a memory capacity of 32 megabits in all, a memory area of 16 megabits of which is assigned to the main CPU 21, for example. The remaining memory area of the RAM 22 is assigned to the video block 12 and audio block 13. ROM 23 stores initial programs or bootstrap programs for the hardware and for the cassette ROM and the CD-ROM.

The system control unit 24 functions as a co-processor to the main CPU 21 so that the unit 24 interfaces 16-bit bus 17 to which the video block 12, audio block 13 and auxiliary block 14 are connected with 32 bit bus 26 to which the main CPU 21 is connected.

When the electric power is on and/or a reset button is pushed down, the sub CPU 25 not only resets the entire system but also carries out data collection from the peripheral devices such as the controllers 3a and 3b to control the peripheral devices. Also the sub CPU 25 can change the clock frequency of the entire system.

The sub CPU 25 further includes a connection-exchanging means described below. The connection-exchanging means selectively connects the peripheral devices such as the controllers 3a and 3b connected to the connector ports 4a and 4b with either a CPU core 31 (refer to FIG. 3) in the sub CPU 25 or the main CPU 21.

The video block 12 forms video signals on the basis of video control signals given from the main CPU 21 through the system control unit 24 and provides the monitor 6 the video signals through the cable 8a. This permits the monitor 6 to display images on its screen. The details of the video block 12 may be referred to PCT/JP94/01068 (filed Feb. 24, 1995 in U.S.), PCT/JP94/01067 (filed Feb. 27, 1995 in U.S.), PCT/JP94/01066 (filed Feb. 27, 1995 in U.S.).

The audio block 13 generates digital audio signals on the basis of audio control signals given from the main CPU 21 through the system control unit 24, converts those digital audio signals into corresponding analog audio signals by a digital/analog (DA) converter incorporated therein, and provides the monitor 6 the converted analog audio signals through the cable 8b. Such processing permits an audio speaker of the monitor 6 to produce sound.

Figure 3:
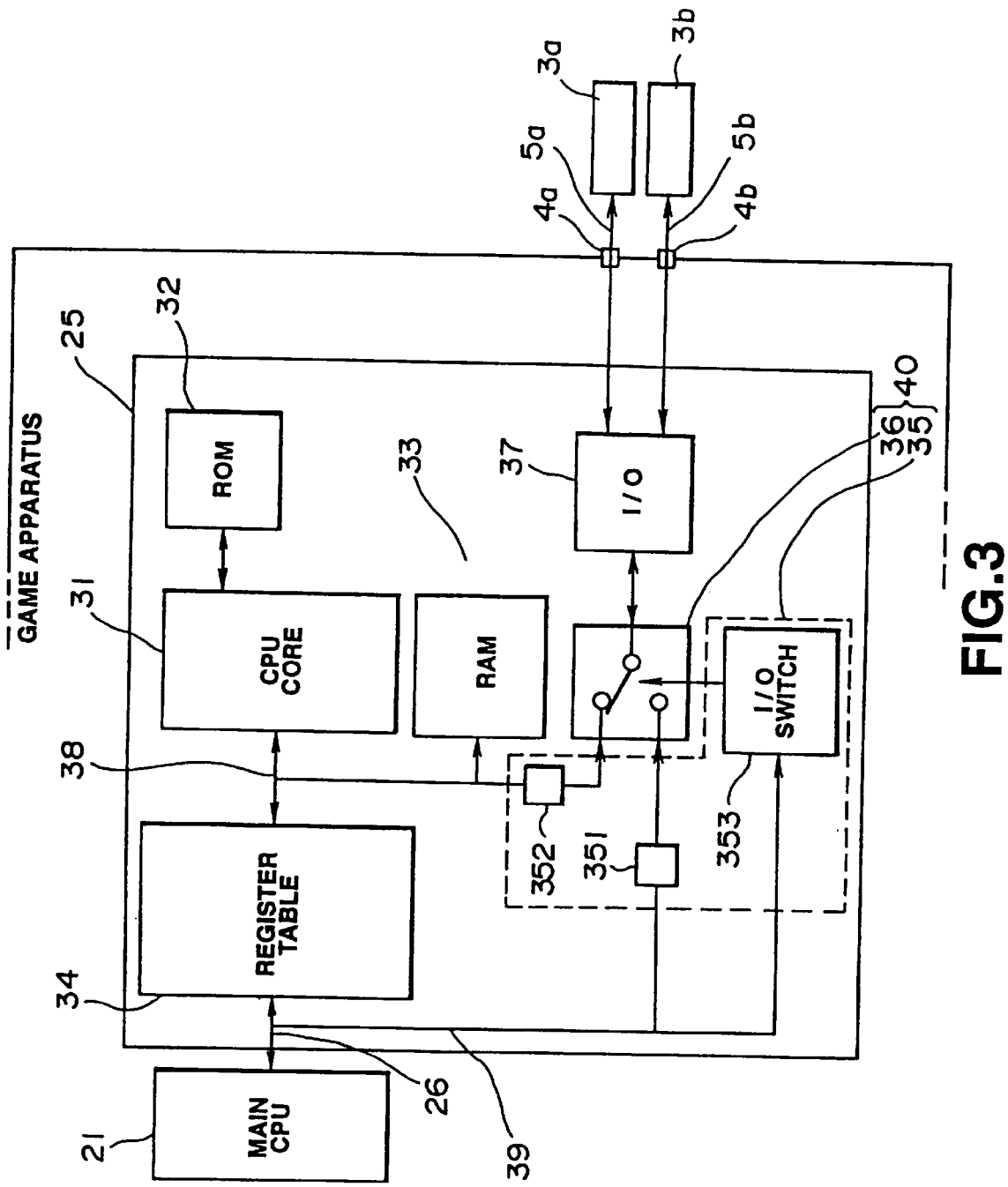
FIG. 3 is a block diagram showing the connection between a main CPU and a sub CPU functioning as a system for managing and controlling peripheral devices and showing the block diagram of the sub CPU.

The sub CPU 25 will be explained with reference to FIG. 3. FIG. 3 represents in block diagram the configuration of the sub CPU 25 which acts as a unit for controlling and managing peripheral devices. As shown in the figure, the sub CPU 25 is coupled with the main CPU 21 by way of the bus line 26. The sub CPU 25 comprises a CPU core 31, ROM 32, RAM 33, register table 34, register group 35, multiplexer 36, and I/O interface 37.

The CPU core 31, for example, may be a 4-bit CPU. The CPU core 31 is coupled with the ROM 32 to receive required programs from the ROM 32. Coupled with the CPU core 31 through a bus line 38 are the RAM 33, register table 34, and the register group 35. Further, the register group 35 is coupled with the I/O interface 37 via the multiplexer 36. The register group 35 and multiplexer 36 compose the connection-exchanging means 40.

The register group 35 may be sub-grouped into a main-CPU register group 351, a sub-CPU register group 352, and an I/O section register 353. The main-CPU register group 351 has two terminals; one is connected with the main CPU 21 through a bus line 39 and the bus line 26, while the other is connected with one of the two exchanging terminals of the multiplexer 36. The sub-CPU register group 352 has also two terminals; one is connected with the CPU core 31 through a bus line 38, while the other is connected with the other of the exchanging terminals of the multiplexer 36.

The multiplexer 36 has a common terminal connected with the I/O interface 37. The interface I/O 37 is connected with the connector ports 4a and 4b. The connector ports 4a and 4b are connected, through cables 5a and 5b, with the controllers 3a and 3b, respectively.

In response to data specified in the I/O section register 353, the multiplexer 36 functionally connects the peripheral devices such as the controllers 3a and 3b selectively to either the CPU core 31 through the register group 352 and bus line 38 or the main CPU 21 through the register group 351 and bus lines 39 and 26.

The CPU core 31 is designed such that, when the CPU core 31 is electrically connected with the peripheral devices via the multiplexer 36, the CPU core 31 communicates with the peripheral devices in the order of "peripheral ID-1", "peripheral ID-2", "data size" and "data", decides a communication mode from those IDs(identification data), and then performs collection, transmission and exchanges etc. of the data.

In this embodiment, the data "peripheral ID-1", which consists of 4-bit data, represents a communication mode in accordance with the type of a peripheral device. The data "peripheral ID-2", which also consists of 4-bit data, is a type of data representing the device model of a peripheral device and consists of a set of data showing a device model focusing on signal types showing whether the signal is, for example, analog or digital. The "data size" represents the total bite number of data from a peripheral device and will be shown by references "DSIZE0 to DSIZE3" in figures described below. The "data" represents data, which are supplied from a peripheral device, of the total bite number specified by the "data size". The CPU core 31 reads the data having the above total number at every 4-bit, because the CPU core 31 is a 4-bit processor in this embodiment.

Although the register group 35, multiplexer 36 and I/O interface 37 have two-channel circuits, respectively, this embodiment shows only one-channel circuit for simplified explanation.

Details of sub CPU 25 may be referred to co-pending Japanese patent applications Nos.6-246579 and 6-246580.

Figure 4:
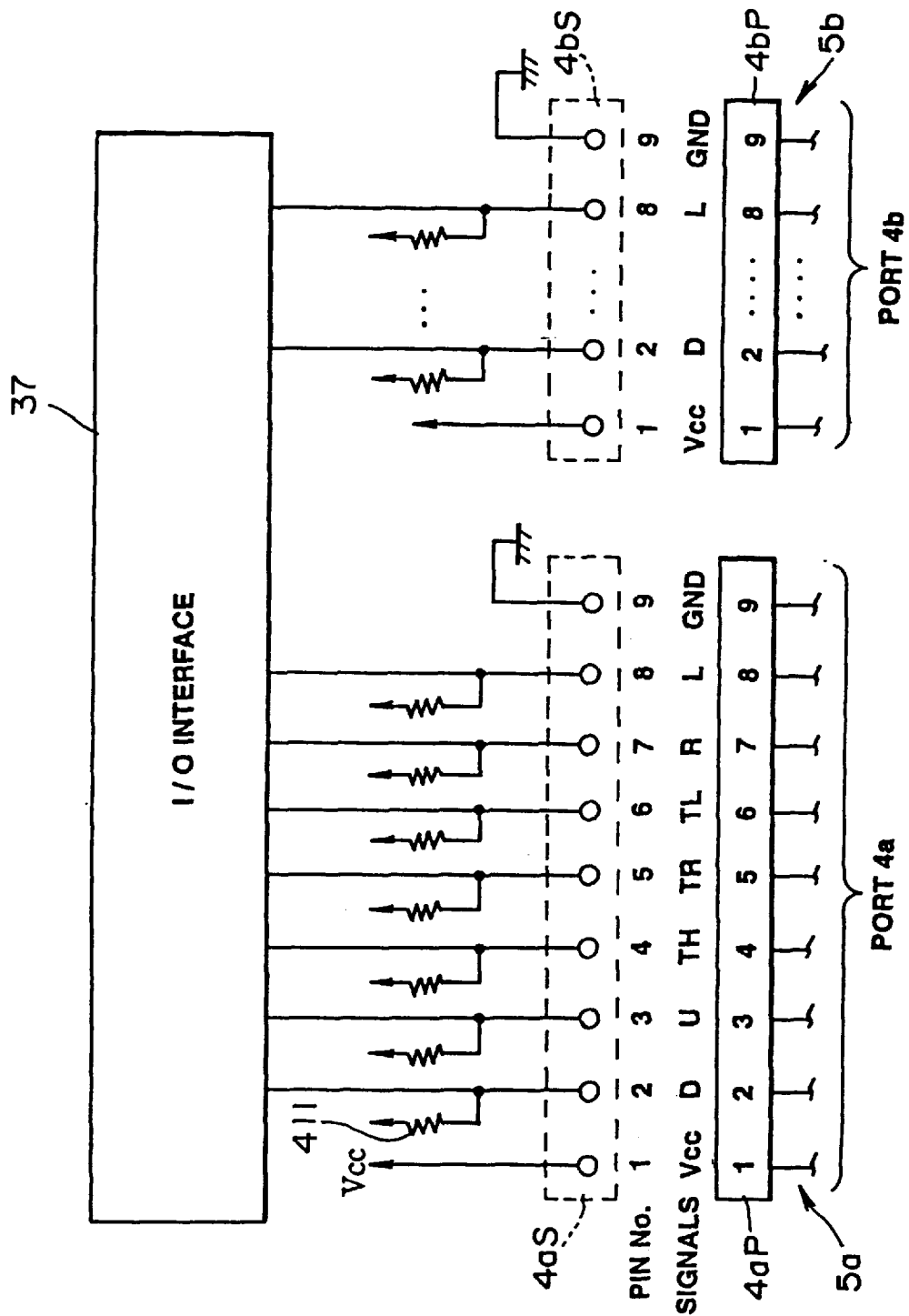
FIG. 4 shows a connector configuration of peripheral ports.

As shown in FIG. 4 the I/O interface has two channels connected to peripheral ports 4a and 4b. Each of the peripheral ports 4a and 4b has a set of socket pins 1 through 9. Pins 2 through 8 are connected to I/O interface and assigned to send and receive a set of specific signals. Names and functions of the signals are shown in Table 1.

As shown in FIG. 4, each of plugs 4ap and 4bp which are to be connected to the sockets 4as and 4bs respectively has a set of plug pins 1 through 9 corresponding to the socket pins 1 through 9. The plug 4ap and 4bp are connected to main circuits of peripheral devices via cables 5a and 5b.

TABLE 1

| Signal Name | Pin No. | Remarks |
| --- | --- | --- |
| TH | 4 | Control signal from game apparatus |
| TR | 5 | Control signal from game apparatus |
| TL | 6 | Control signal to game apparatus(ack) |
| R | 7 | Data signal (third bit) |
| L | 8 | Data signal (second bit) |
| D | 2 | Data signal (first bit) |
| U | 3 | Data signal (0-th bit) |
| Vcc | 1 | Power Source(+5V) |
| GND | 9 | GND |

Pins nos. 4 to 6 are assigned for control signals. Pin no. 4 is the first control pin and assigned for transmitting a peripheral selection signal TH from the game apparatus 2 to the peripheral device (for example, controllers 3a, 3b). Pin no. 5 is the second control pin and assigned for transmitting a data request signal TR from the game apparatus to the peripheral device. Pin no. 6 is the third control pin and assigned for transmitting a peripheral acknowledgement signal TL from the peripheral device to the game apparatus.

Pins nos. 2, 3, 7 and 8 are assigned for data signals. Pin no. 2 (the first data pin) is assigned for transmitting a bit data D, pin no. 3 (the second data pin) for a bit data U, pin no.7 (the third data pin) for a bit data R, and pin no.8 (the fourth data pin) for a bit data L, respectively. The data R is mainly used for data transmission to the game apparatus 2. The input/output directions of data for these signals D, U, R and -L can optionally be specified in accordance with the kind of the peripheral device connected to the apparatus 2. The signal R represents the third bit of the data, L the second bit, D the first bit and U the 0-th bit , respectively.

Pins 2 through 8 are connected to an electric power source Vcc by way of resisters 411, respectively, thereby to pull up the voltage levels of the signal lines (pins nos. 2 to 8) to the level of the power source Vcc.

When a peripheral device is not connected to the port 4a (4b) the voltage level on each of pins nos. 2 to 8 is equal to the voltage value of the power source Vcc (i.e. logical value=binary value "1"). Thus, the sub CPU 25 identifies that a peripheral device is not connected to the socket 4as (4bs) when it receives these data of the voltage state "1", for example, for D, U, R and L.

Pins nos. 5 and 6 are mainly assigned for transmitting control signals between the game apparatus and the peripheral devices in the above description. However, pins 5 and 6 may be used for data signal transmission where a peripheral device employs either the clocked parallel communication mode or clocked serial communication mode which will be described below.

Pin no. 1 is assigned to the signal Vcc which represents the power source (voltage:+5V). The pin no.9 is assigned to the signal GND which represent the ground potential (voltage: zero).

FIGS. 5A to 5C explain a variety of pin configurations for plugs 4ap and 4bp which vary depending on communication modes employed by peripheral devices. FIG. 5A shows a pin configuration for standard communication modes including a TH/TR-selection communication mode and a three-wire handshake communication mode, FIG. 5B shows a pin configuration for a clocked parallel communication mode (clock-synchronized-type parallel communication mode), and FIG. 5C shows a pin configuration for a clocked serial communication mode (clock-synchronized-type serial communication mode), respectively. The clocked parallel and serial communication modes correspond to the non-standard type of modes.

These pin configurations are prepared to easily comply with a large number of types of peripheral devices, such as a control PAD, mouse, key board, modem and memory unit, and with different communication modes which may change according to peripheral devices.

Typical communication modes employed by a variety of peripheral devices are, for example, a TH/TR-selection communication mode, a three-wire handshake mode, a clocked parallel mode, and a clocked serial mode. A peripheral device employing the TH/TR-selection and three-wire handshake communication modes requires all of the socket/plug pins 1 through 9 of the connector port 4a (4b) to be used electrically independently. Accordingly, as shown in FIG. 5A, all the pins 1 through 9 of the plug 4ap (4bp) are not short-circuited to each other.

On the other hand, where a peripheral device employs the clocked parallel communication mode, pin no. 5 assigned for the data request signal TR and pin no. 6 assigned for peripheral acknowledgment signal TL can electrically be short-circuited as shown in FIG. 5B. Further, in case of a peripheral device employing the clocked serial communication mode, the data transmission lines in the connector port 4a (4b) can be reduced to one line in principle, and it is possible to transmit data through the one data line in cooperation with the two peripheral selection line (TH) and data request line (TR). Accordingly, as shown in FIG. 5C, pin no. 2 may be connected to Vcc and pins 6 to 8 may be connected to GND.

As is exemplified above, it is understood that each of the connector ports 4a and 4b have a certain requirement in the number of needed signal lines (i.e., pins), which is determined in accordance with the employed communication mode. The processing apparatus 2 can use logical values on specified signal lines (in other words, specified pins) at the connector ports 4a and 4b to decide communication modes. Namely the apparatus 2 can determine the communication modes according to the logical values on the signal lines (pins).

Thus, in order to identify the employed communication mode, it should be essential to know the numbers of pins required to transmit data and the logical values on each signal line (i.e., each specified pin). In the present embodiment, the pin configurations of the plugs are designed to be able to transmit effectively to the apparatus 2 the logical values required to decide the communication mode employed by a peripheral device. In consequence, the apparatus 2 can quickly decide the employed communication mode.

Where the communication mode of a peripheral device is clocked parallel mode, the pin configuration of each plug 4ap (4bp) of the connectors are shown in FIG. 5B. In this mode, the apparatus 2 transmits to the controllers 3a and 3b a specified logical value ("1" or "0") as the peripheral selection signal TH and given clock signals as the data request signal TR. In response to this, signals of required logical values are then quickly provided through the data lines from the controllers 3a and 3b in synchronization with the clock signals. As shown in FIG. 5B, the pin 5 for the data request signal TR is short-circuited with the pin 6 for the peripheral acknowledgment signal TL in this clocked parallel communication mode, thereby the signals (voltages) on both the plug pins no. 5 and 6 being the same. Accordingly the signal TR transmitted from the apparatus 2 to pin no. 5 is sent back almost simultaneously from pin no. 6 to the apparatus 2 as the signal TL. Thus, the apparatus 2 identifies the clocked parallel mode by sensing signal TL equal to signal TR.

Further, in case of a peripheral device of the clocked serial communication mode, only one signal line (U) is required to transmit data. In addition, only the peripheral selection signal line (TH) and data request signal line (TR) transmitting clock signals, are required as control lines. And logical values needed to identify this communication mode may be set as R=L="0", D="1", and U="1". These requirements may be realized by such pin configurations of the plugs 4ap and 4bp as shown in FIG. 5C in which plug-pins which are not used for transmitting data and control signals are connected to fixed potentials (Vcc and GND). For example, pin no. 2 is connected to the power source Vcc and pins nos. 6 to 8 are connected to the ground GND. This plug-pin configuration will make it possible to produce required logical values representing the clocked serial communication mode at the pins of the plugs 4ap and 4bp, thus such logical values being supplied to the apparatus 2.

The short-circuit between the pins in FIGS. 5B and 5C may be achieved either by putting a short-circuit wire bridging connecting portions at which the plug pins are connected to the corresponding wires contained in the cable 5a (or 5b) in the plug or by providing a short-circuit pattern on a printed circuit board arranged in the plug 4ap (4bp). This reduces in number wires in the cable 5a (or 5b) connecting the plug 4ap (4bp) to the main circuit of a peripheral device.

The foregoing short-circuit can be achieved within the main circuit of a peripheral device either by putting a short-circuit wire bridging wires of the cable 5a (or 5b) or by forming a specified short-circuit printing pattern on a printed circuit board. Though this short-circuit design cannot reduce the cable 5a (or 5b) in number, the plug can be reduced in size.

Particularly in the case of pin configuration of the plug 4ap (4bp) shown in FIG. 5C assigned to the clocked serial communication mode, the no. 2 pin is short-circuited and electrically connected to the no. 1 pin (signal Vcc; power source pin) and the pins nos. 6 to 8 are all short-circuited and electrically connected to the no. 9 pin (signal GND; ground pin). And accordingly wires in the cable connecting the plug 4ap (or 4bp) with the main circuit of a peripheral device can largely be decreased in number, because only the lines of the data signal U and the control signals TH and TL are required.

On one hand, when the pin configuration of FIG. 5C is effectively realized within a peripheral device, the lines of the cable, independent of signal transmission, are electrically connected to the power source and the ground potential, which leads to reduced noises which may fall onto the lines.

The functional and hardware schematic diagrams of controllers as representatives of peripheral devices employing the foregoing various communication modes will now be explained, respectively, with reference to FIGS. 6A to 6D and 7A to 7D which use part of the same reference numerals as ones described above.

Figure 6A:
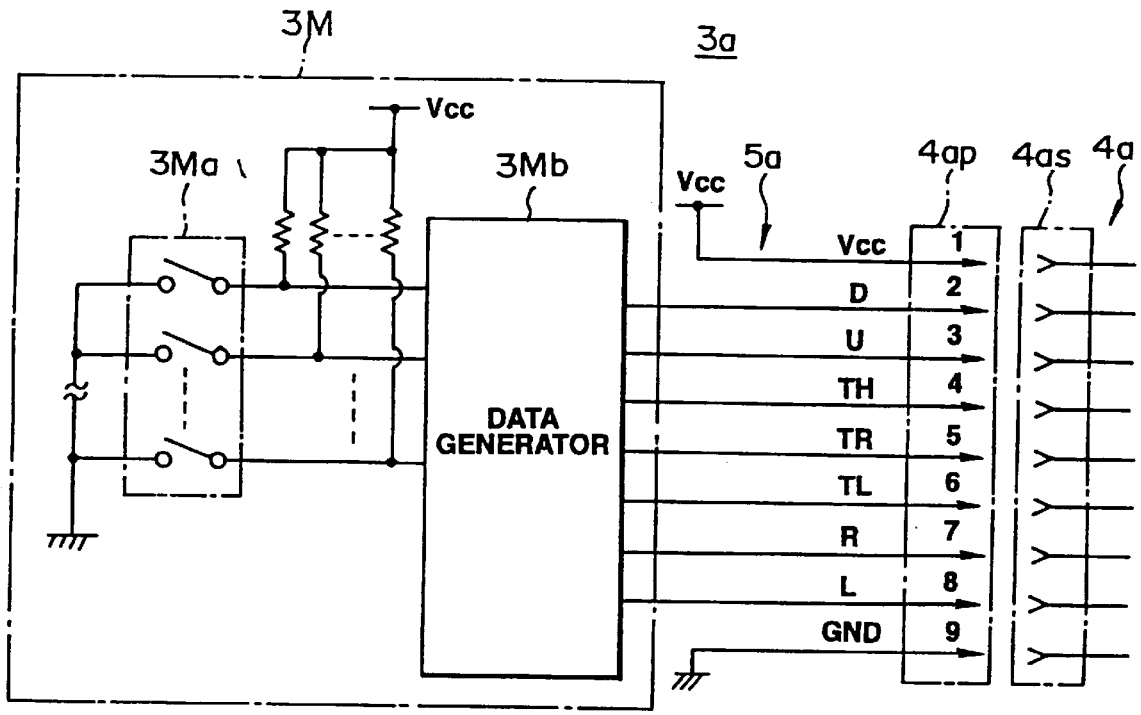
FIG. 6A to 6D are functional block diagrams of typical controllers as peripheral devices.

FIG. 6A shows a controller 3a employing the TH/TR-selection communication mode. The controller 3a comprises the plug connector 4ap, the cable 5a having nine wires connected to the nine plug pin nos. 1 to 9 of the plug connector 4ap, and a main circuit 3M to which the wires of the cable 5a are connected. The nine plug pin nos. 1 to 9 are electrically independent from each other and individually connected to the nine wires of the cable 5a. The main circuit 3M has an operating portion 3Ma and a data generator 3Mb. The operating portion 3Ma, which is operated by a player, includes keys and/or switches. The data generator 3Mb is formed by circuits such as hardware logic circuits or a CPU system such that a specific group of 4-bit data R, L, D, U including data generated at the operating portion 3Ma are selected from other data groups and supplied through the plug pin nos. 2, 3, 7, 8 in response to bit patterns of both the peripheral selection signal TH and data request signal TR.

Figure 7A:
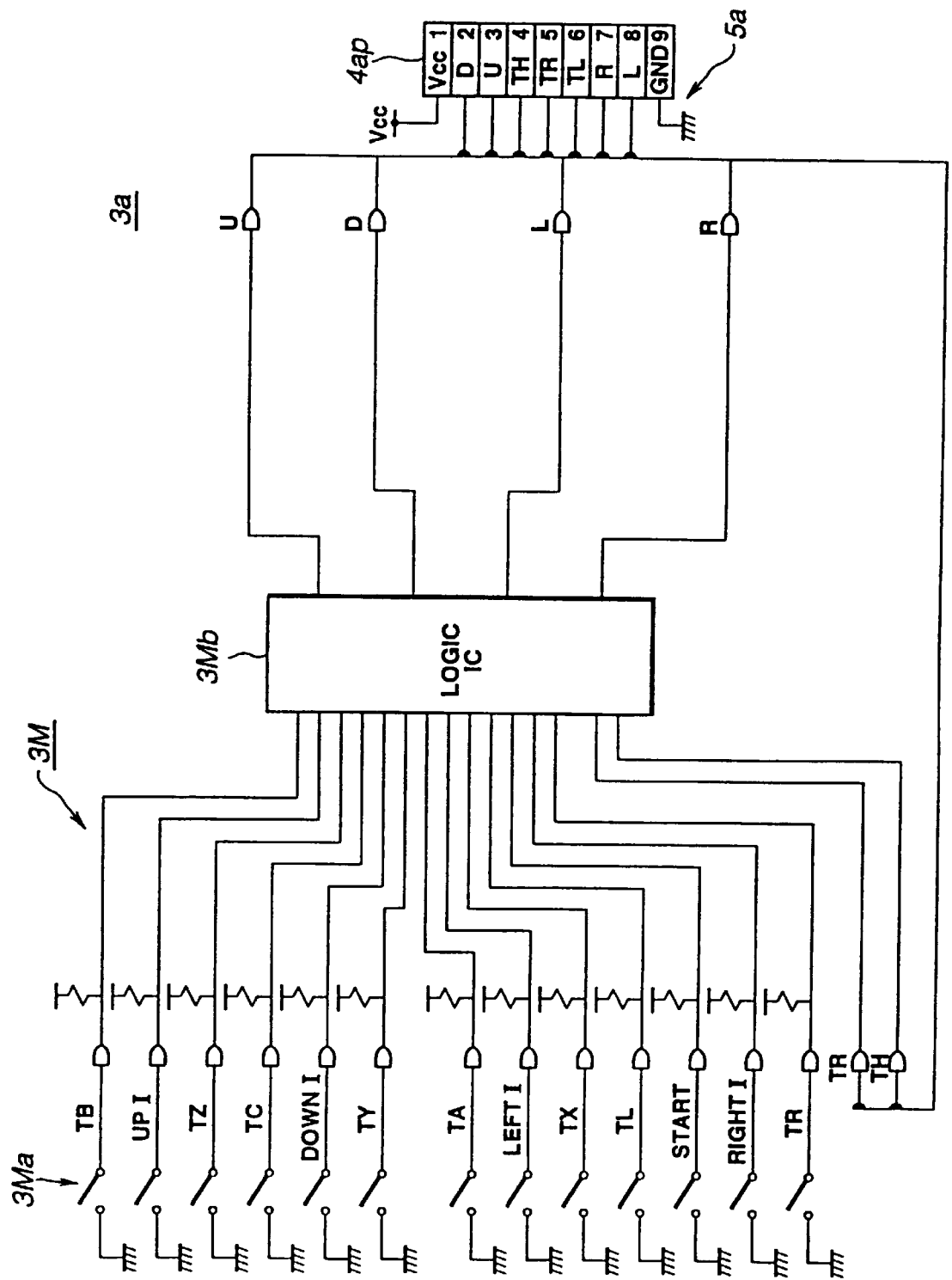
FIGS. 7A to 7D are detailed circuit diagrams of typical controllers as peripheral devices.

One detailed hardware schematic diagram of a controller 3a employing the TH/TR-selection communication mode is exemplified in FIG. 7A. As shown therein, the data generator 3Mb consists of a one chip type logic IC containing buffers and other logic gates such as AND and NAND gates for carrying out the foregoing operation. Various key switches arranged on the top cover of the controller 3a and pushed by a player are connected to the logic IC 3Mb. Among them are a start key "START", 4-way directional keys "UP(I)", "DOWN(I)", "LEFT(I)" and "RIGHT(I)", specialized right- and left-steering keys "T R" and "T L", and other keys "T A" to "T C" and "T X" to "T Z" assigned for special functions such as jumping and rotation in a monitor screen. The logic IC 3Mb selects key data of the above key switches every one group (three keys or four keys are combined as one group) in response to bit patterns of the 2-bit data selecting signals TH and TR (i.e., peripheral selection signal TH and data request signal TR).

Figure 6B:
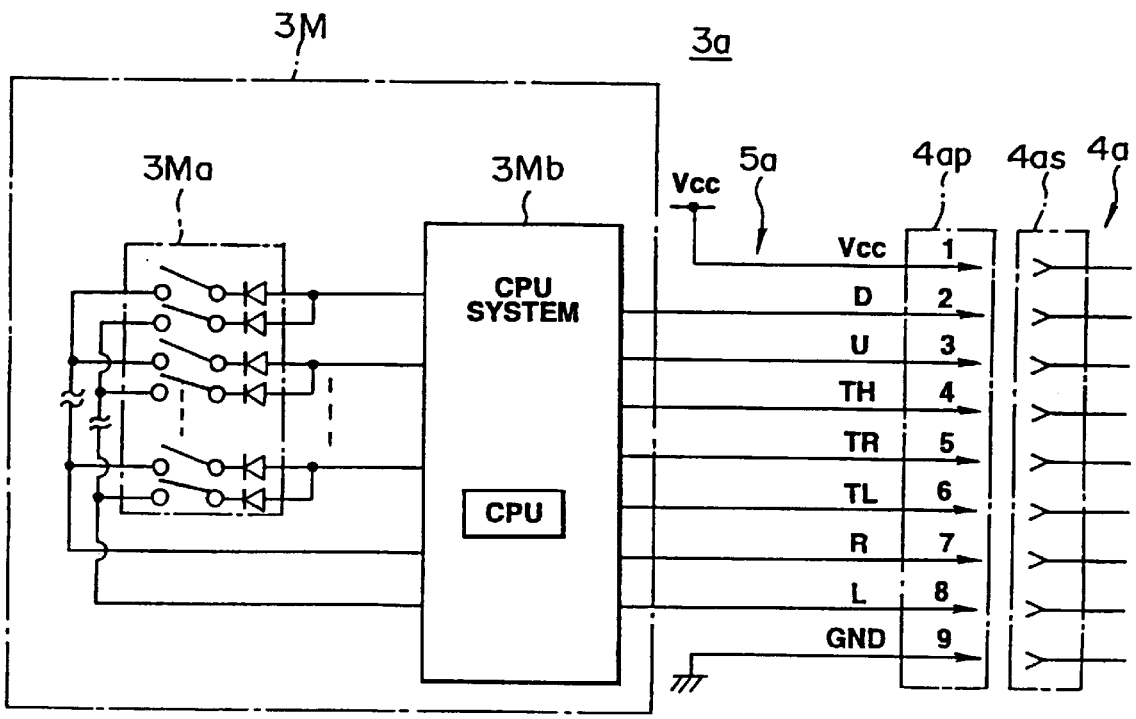

FIG. 6B shows a controller 3a employing the three-wire handshake communication mode. The controller 3a comprises the plug connector 4ap, the cable 5a having nine wires connected to the nine plug pin nos. 1 to 9 of the plug connector 4ap, and a main circuit 3M to which the wires of the cable 5a are connected. The nine plug pins 1 to 9 are electrically independent from each other and individually connected to the nine wires of the cable 5a. The main circuit 3M has an operating portion 3Ma and a CPU system 3Mb. The CPU system 3Mb has a CPU and functions as a data generator which is responsive to the operating portion 3Ma. A data generator formed by hardware logic circuits can be adopted as a substitute for the CPU system. The CPU system 3Mb communicates with the game apparatus 2 using the three signals TH, TR, and TL sequentially inputted or outputted through the plug connector 4ap and then supplies 4-bit parallel data R, L, D, U including data generated at the operating portion 3Ma to the game apparatus 2 through the plug connector 4ap. When output signals from an operating portion 3Ma are analog quantities, the operating portion 3Ma includes signal processing circuits such as an A/D convertor.

Figure 7B:
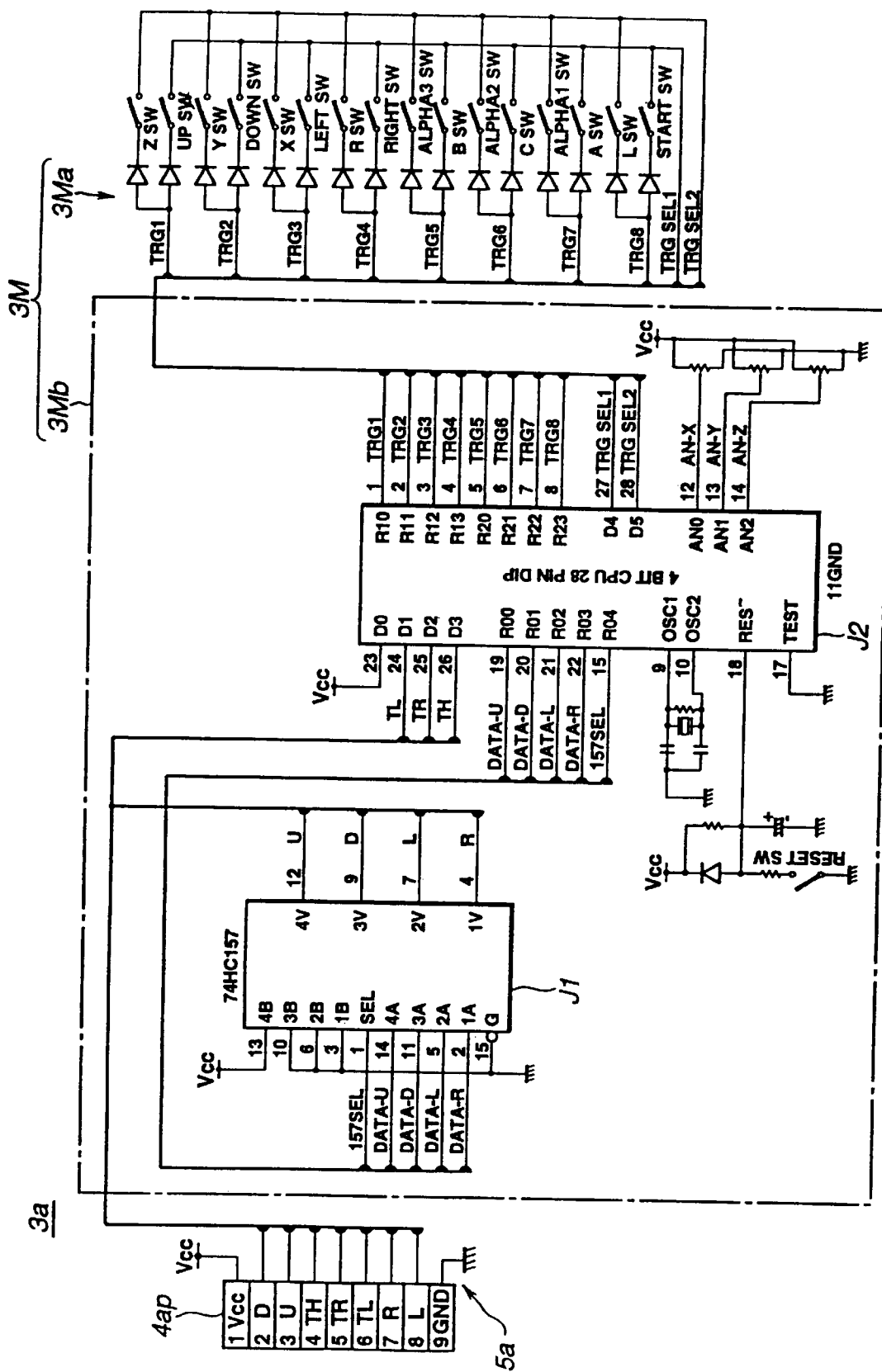

For example, one controller 3a employing the three-wire handshake communication mode is shown in detail in FIG. 7B, which has a CPU system 3Mb and executing the foregoing signal processing. The CPU system 3Mb includes IC J1 (part No. 74HC0157) which functions as a selector for selecting ID data. The selector includes four of 2-inputs/1-output type selecting circuit connecting to another IC J2 which is a 4-bit microcomputer (CPU). Various key switches operated in a video game, for instance, which composes the operating portion 3Ma, are connected to IC J2. Thus in response to the peripheral selection signal TH and data request signal TR, the microcomputer not only reply by sending out the peripheral acknowledgement signal TL but also reads the states of the key switches, and outputs them as 4-bit data R, L, D, U by way of IC J1.

Figure 6C:
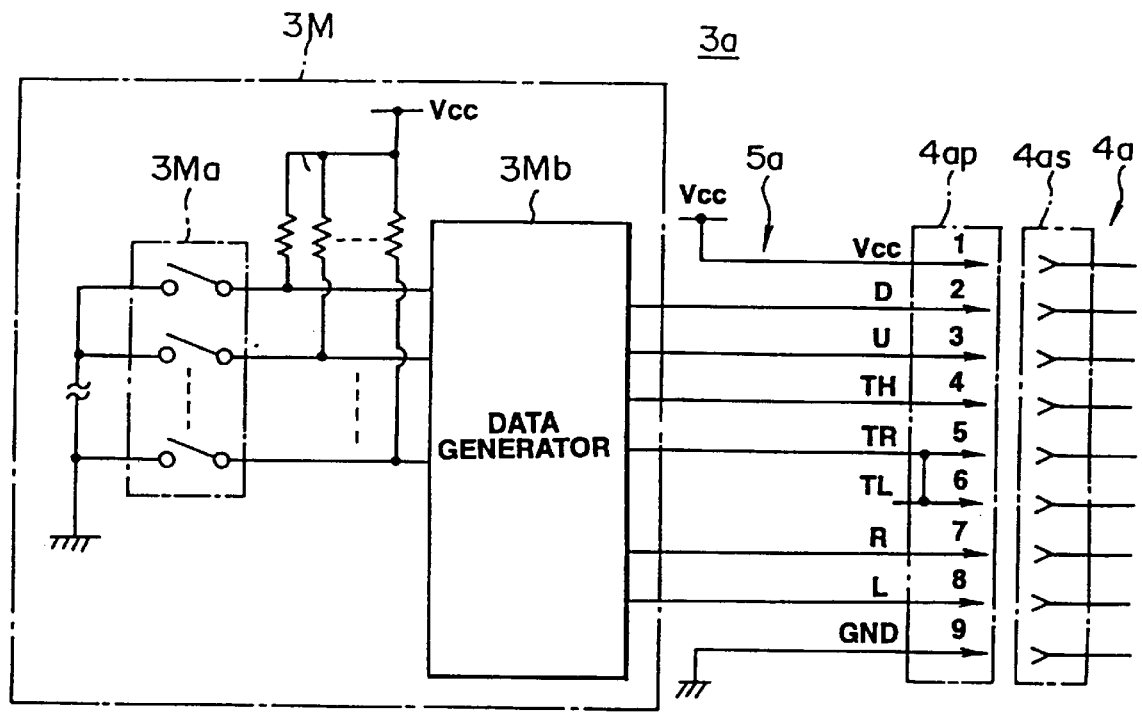

FIG. 6C shows a controller 3a employing the clocked parallel communication mode. The controller 3a also comprises the plug connector 4ap of nine pin nos. 1 to 9, the cable 5a, and a main circuit 3M. Among the nine plug pin nos. 1 to 9, the pins of nos. 5 and 6 are short-circuited at their pin portions to each other and the remaining pins are still electrically independent. The plug pins of nos. 1 to 5 and 7 to 9 are coupled with the respective wires of the cable 5a. The main circuit 3M has an operating portion 3Ma and a data generator 3Mb which can be constructed using gate array circuits, for example. The data generator 3Mb, through the plug connector 4ap, sequentially receives the peripheral selection signal TH and data request signal TR (potentially equal to the peripheral acknowledgement signal TL due to the short circuit) and, almost simultaneously with the reception of the signal TR, supplies to the game apparatus 2 4-bit parallel data including data generated at the operating portion 3Ma. The plug pin configuration of this mode reduces the number of wires of the cable 5a by one, as shown in FIG. 6C. The clocked parallel communication mode permits the game apparatus 2 to communicate with the controller 3a in the same manner as the three-wire handshake mode.

Figure 7C:
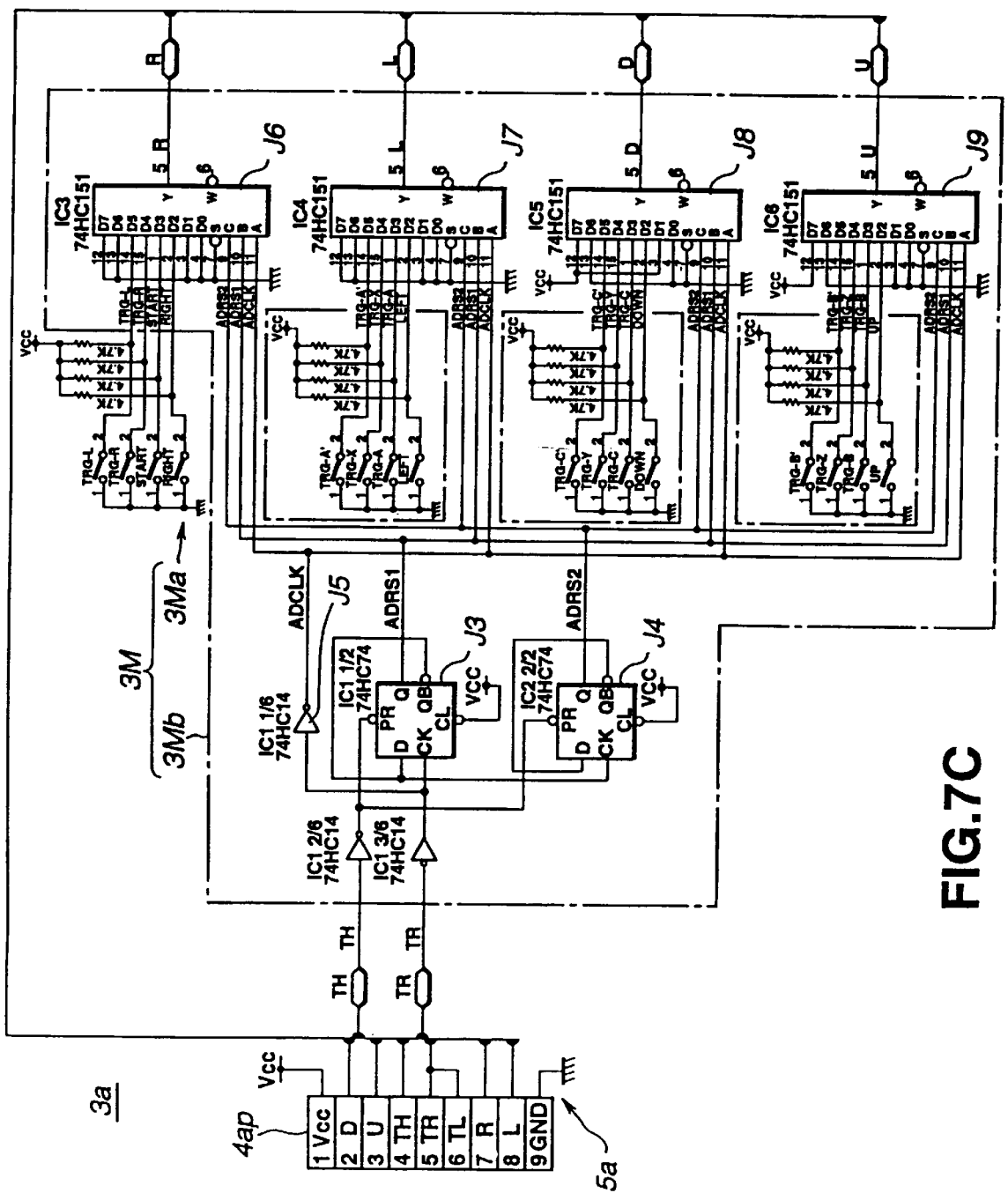

FIG. 7C exemplifies the detailed internal block diagram of a controller 3a employing the clocked parallel communication mode. A data generator 3Mb, which consists of gate arrays, plays a key role for the foregoing operation in the controller 3a. The data generator 3Mb includes ICs J3, J4 (part No. 74HC74) and IC J5 (74HC14) which play together a key role for generating a 3-bit data selecting signal supplied to each of four parallel-arranged ICs J6 to J9. ICs J6 to J9 (part No. 74HC151) are selectors of 8-inputs/1-output type and each arranged to receive key data from each of four-divided key groups in the key switches of the operating portion 3Ma. Each of ICs J6 to J9 selects one data (including ID data or key data) responsibility to bit patterns of the supplied 3-bit data selecting signal (i.e., address signal). Thus, 4-bit parallel data R, L, D, U are outputted from ICs J6 to J9.

Figure 6D:
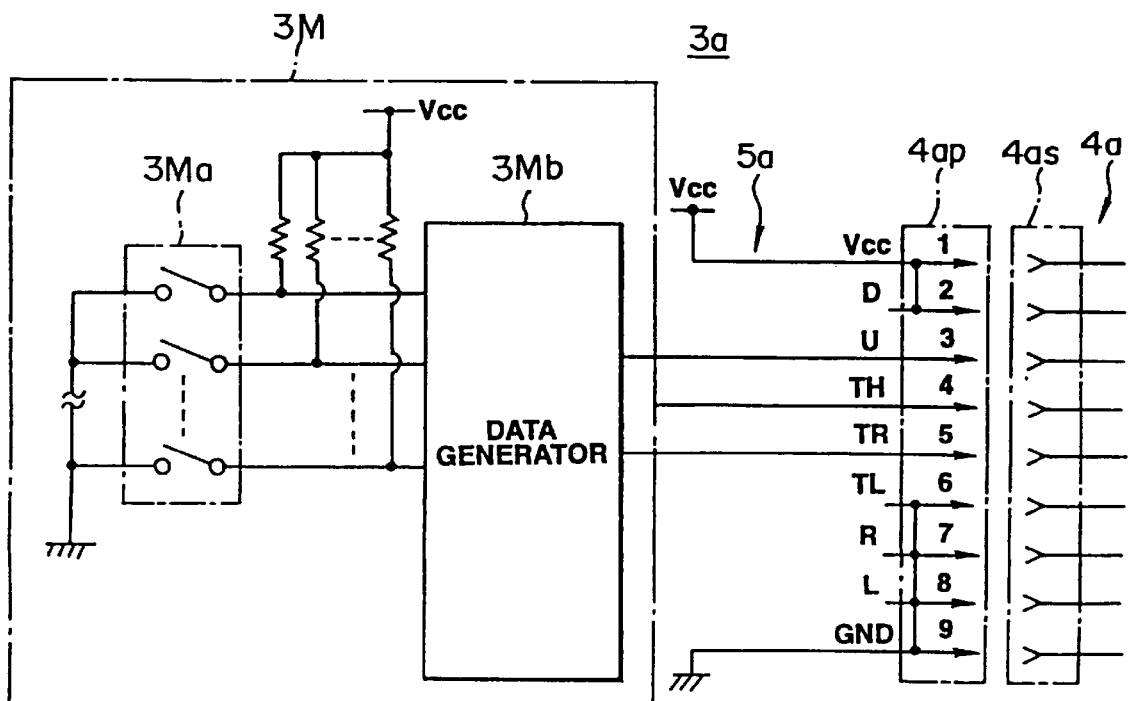

FIG. 6D shows a controller 3a employing the clocked serial communication mode. The controller 3a also comprises the plug connector 4ap of nine pins of nos. 1 to 9, the cable 5a, and a main circuit 3M. Among the nine plug pins of nos. 1 to 9, the pins of nos. 1 and 2 are short-circuited and the pins of nos. 6 to 9 are short-circuited, respectively, at their pin portions to each other and the remaining pins are still electrically independent. The plug pins of nos. 1, 3 to 5, and 9 are coupled with the respective wires of the cable 5a. The main circuit 3M has an operating portion 3Ma and a data generator 3Mb which can be constructed using gate array circuits, for example. The data generator 3Mb, through the plug connector 4ap, sequentially receives the peripheral selection signal TH and data request signal TR, and in response to clock pulse inversion, supplies to the game apparatus 2 serial data including data generated at the operating portion 3Ma. The plug pin configuration of this mode remarkably reduces the number of wires of the cable 5a by four, as shown in FIG. 6D.

Figure 7D:
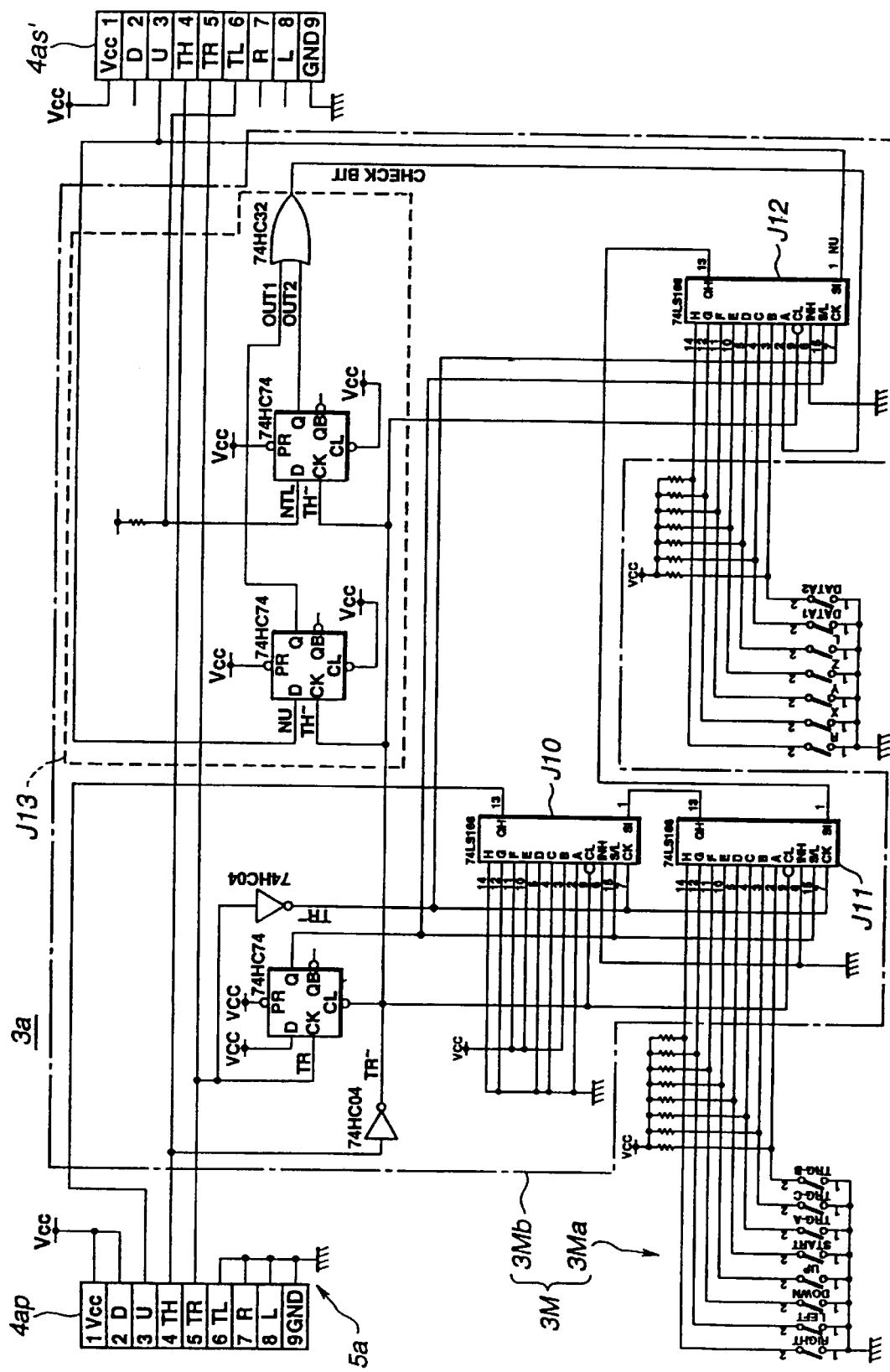

FIG. 7D shows one detailed example of a controller 3a employing the clocked serial communication mode. The controller 3a has a data generator 3Mb consisting of gate arrays, where included are ICs J10 to J12 (part No. 74LS166), which are cascade-connected, are shift registers. IC J10 placed at the first stage are used for sending ID data in sequence. ICs J11 and J12 placed at the second and third stages are connected to the key switches of the operating portion 3Ma and used for sending serial key data U. Thus in response to the peripheral selection signal TH and data request signal TR, ICs J11 to J12 sends out ID data and key data in sequence. This controller 3a has facilities for a cascade connection of controllers. In other words, there is provided a circuit J13 for recognizing whether serial data from another cascade-connected controller are inputted through a socket connector 4as'.

In FIGS. 6C and 6D, and 7C and 7D, such short-circuit configuration can be achieved in the side of the main circuit 3M.

In the present embodiment, when the plug 4ap (or 4bp) connected to the controller 3a (or 3b) is inserted into the socket 4as (or 4bs) arranged in the apparatus 2, the foregoing plug pin configurations permit the sub CPU 25 to communicate to process in the order of "peripheral ID-1", "peripheral ID-2", "data size", and "data", even though the controller 3a (or 3b) as the peripheral device adopts different communication modes or different device types, Also the foregoing plug pin configuration provides the communication of "peripheral IDs" and "data" in a proper state, although types and/or communication modes of peripheral devices are different.

The operation of the apparatus 2 functionally including the system for identifying communication modes of peripheral devices will now be explained with reference to FIGS. 3 to 15 and Table 2 to 6.

Figure 8:
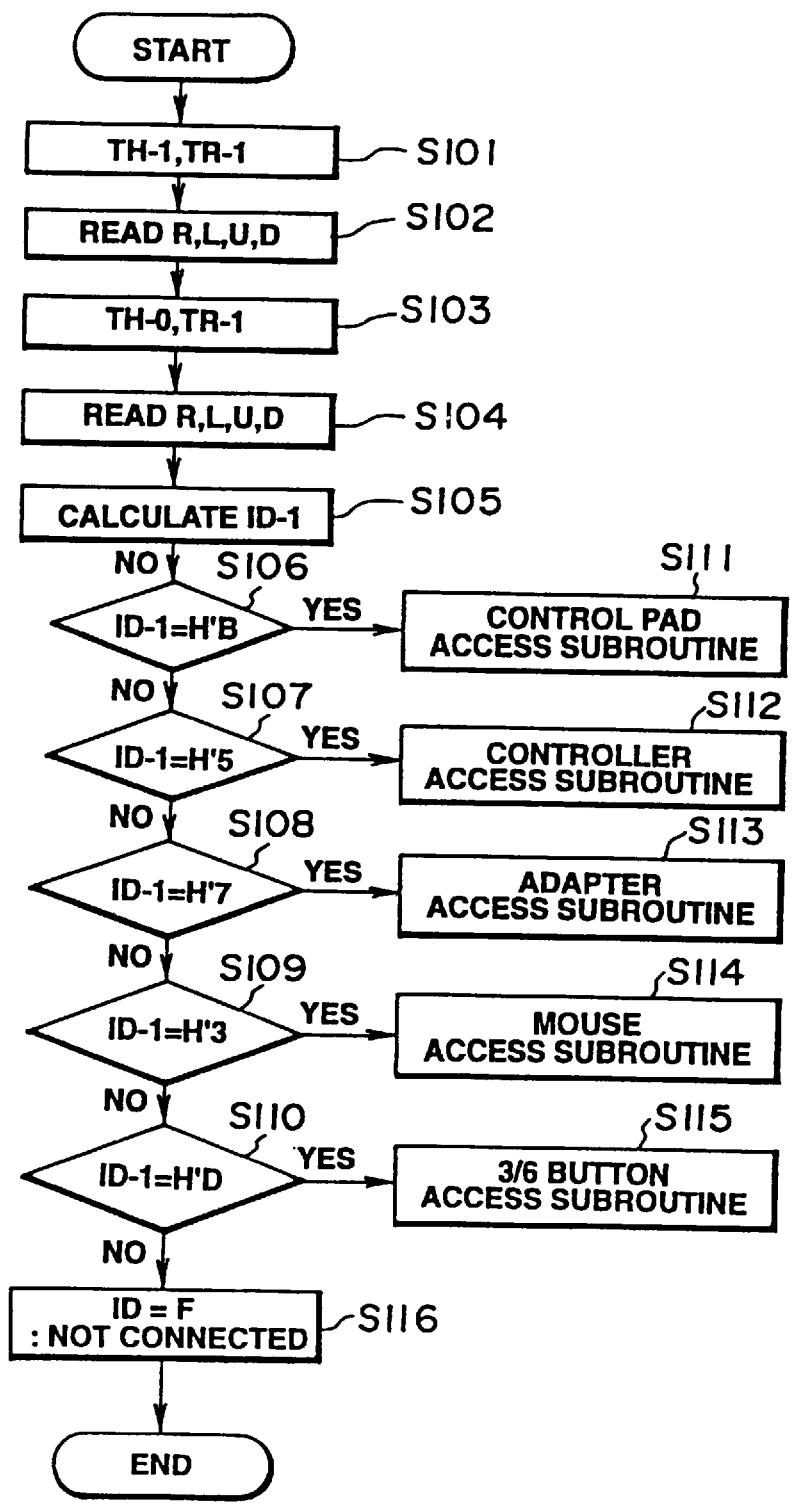
FIG. 8 is a flowchart exemplifying a processing carried out by the sub CPU.

As shown in FIG. 8, after being activated, the sub CPU 25 first outputs the control signals TH="1" and TR="1" (refer to Step S101 in FIG. 7). The CPU core 31 of the sub CPU 25 reads logical values of the data signals R, L, D and U produced on pins 7, 8, 2 and 3 by each of the peripheral devices and stores the read logical values into a predetermined memory area of the RAM 33 (Step S102). The CPU core 31 again outputs the control signals TH="0" and TR="1" (Step S103). In response to this, the CPU core 31 again reads logical values of the data signal R, L, D and U produced by the peripheral devices and stores them into a predetermined memory area of the RAM 33 (Step S104: see the intervals $T_{10}$ in FIG. 12 and $T_{20}$ in FIG. 13).

The CPU core 31 then calculates the "peripheral ID-1" (Step S105). The "peripheral ID-1" can be calculated using the following formula.

[ID-1]={(data R in TH="1") or (data L in TH="1")}×8h+{(data D in TH="1") or (data U in TH="1")}×4h+{(data R in TH="0") or (data L in TH="0")}×2h+{(data D in TH="0") or (data U in TH="0")}×1h where h represents suffix for hexadecimal number. Using the calculated results of [ID-1], the CPU core 31 identifies the types of peripheral devices (Steps S106 to S110). The following table 2 shows a relation between the types of peripheral devices and the calculated results of [ID-1].

TABLE 2

| Peripheral Device | ID-1 |
|---|---|
| 3/6 Button | F |
|  | E |
|  | D |
|  | C |
| Control PAD | B |
|  | A |
|  | 9 |
|  | 8 |
| Adaptor | 7 |
|  | 6 |
| Controller (Peripheral #1) | 5 |
|  | 4 |
| Mouse | 3 |
|  | 2 |
|  | 1 |
| Modem | 0 |

In detail, the CPU core 31 first determines whether or not the calculated result [ID-1] is Bh, for instance. When it is determined that the calculated result [ID-1] be Bh (YES at Step S106), it is decided that the peripheral device be a control PAD packed together with the game system. The relation between peripheral devices and values of ID-1 is shown in Table 2. Thus the CPU core 31 performs the processing of a control PAD access subroutine (Step S111). When the calculated result [ID-1] is not Bh (NO at Step S106), the CPU core 31 then determines whether or not the calculated result [ID-1] is 5h, for example (Step S107).

Figure 9:
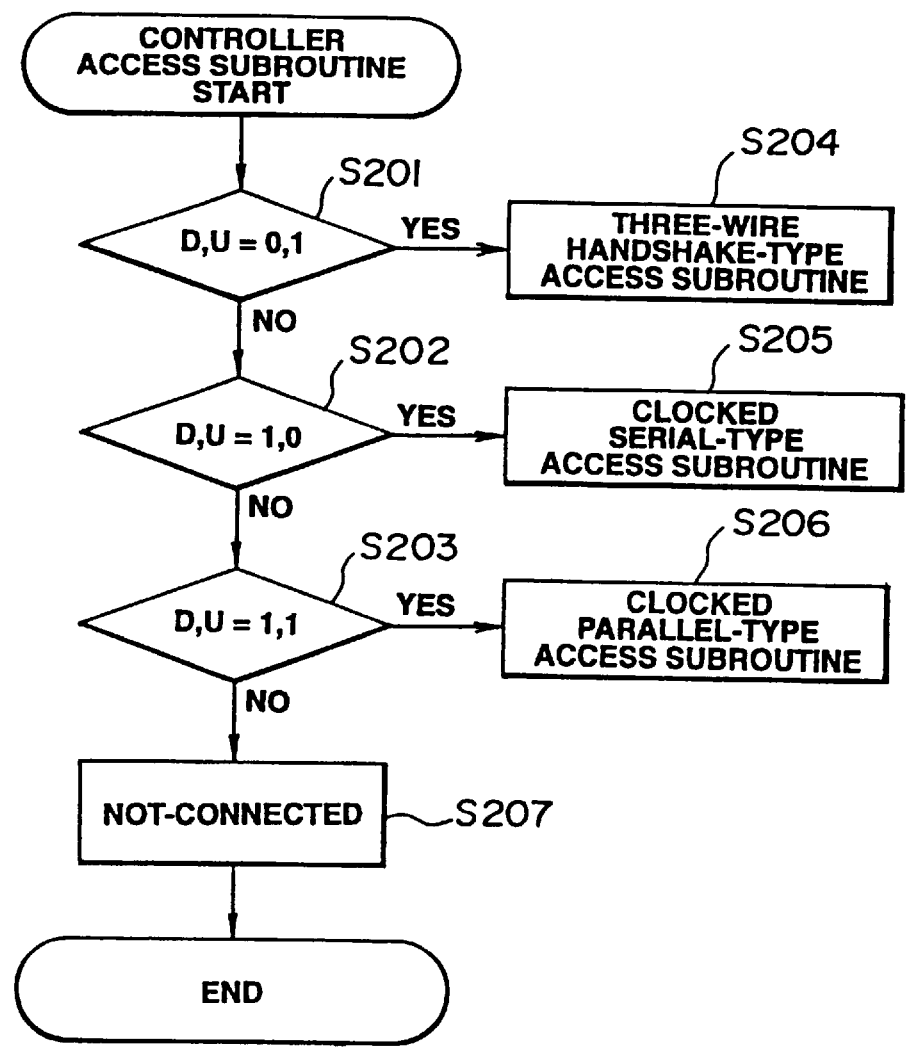
FIG. 9 is a flowchart of an access subroutine to peripheral devices.

When it is determined that the calculated result [ID-1] be 5h (YES at Step S107, also refer to Table 2), a controller access subroutine is processed (Step S112), which is shown in detail in FIG. 9.

When the calculated result [ID-1] is not 5h (NO at Step S107), the sub CPU 25 proceeds to the determination whether the calculated result [ID-1] is 7h, for example (Step S108). When the determination is YES at Step S108 (i.e., the calculated result [ID-1]=7h), the sub CPU 25 then performs an adaptor access subroutine (Step S113).

When it is determined that the calculated result [ID-1] be not 7h (NO at Step S108), the sub CPU 25 continues to determine if the above calculated result [ID-1] is 3h or not, for example (Step S109). Where the calculated result [ID-1] is determined to be 3h YES at Step S109, Table 2), a mouse access subroutine is processed (Step S114).

When the above result [ID-1] is not 3h (NO at Step S109), it is then determined whether or not the calculated result [ID-1] be Dh (Step S110). Where this determination shows that the calculated result [ID-1] is Dh YES at Step S110, Table 2), a 36 button access subroutine is then performed (Step S115). When the determination is NO at Step 110, the processing is continued to Step S116, where a decision that the peripheral device is not connected is made for the calculated result [ID-1]=Fh and a decision to be unknown is made for values of the [ID-1] other than the above exemplified results (refer to Table 2).

As a representative, the control PAD access subroutine will be described. In this subroutine, an access to the control PAD is carried out under the TH/TR-selection communication mode -automatically designated. This communication mode uses 2-bit data consisting of combined two signals of the peripheral selection signal TH and data request signal TL to select a group of data generated in the control PAD. The selected group of data is supplied from the control PAD to the game apparatus. In the present embodiment, the TH/TR-selection communication mode is preferably employed in the control PAD and the 2-bit data can select four patterns for, for example, four-bit data R, L, D and U. The table 3 shows a truth values of this mode, in which the references "RIGHT", "LEFT", "DOWN", "UP", "START", and "TRG-A, B, C, X, Y, Z, L, R" are names of the key portions and switch portions. Data of the peripheral acknowledgment signal TL are ignored in the TH/TR-selection communication mode.

TABLE 3

| DATA | TH | TR | TL | R | L | D | U |
|---|---|---|---|---|---|---|---|
|  | bit6 INPUT | bit5 INPUT | bit4 OUTPUT | bit3 OUTPUT | bit2 OUTPUT | bit1 OUTPUT | bit0 OUTPUT |
| 1st | 1 | 1 | 1 | TRG-L | 1 | 0 | 0 |
| 2nd | 0 | 1 | 1 | RIGHT | LEFT | DOWN | UP |
| 3rd | 1 | 0 | 1 | START | TRG-A | TRG-C | TRG-B |
| 4th | 0 | 0 | 1 | TRG-R | TRG-X | TRG-Y | TRG-Z |

As another representative, the foregoing controller access subroutine shown in FIG. 9 will now be described also with reference to Table 4 which represents the bit patterns of data R, L, D and U corresponding to typical communication modes used by controllers as peripheral devices.

TABLE 4

| Communication | TH = 1 TR = 1 | | | | TH = 0 TR = 1 | | | |
|---|---|---|---|---|---|---|---|---|
| mode | R | L | D | U | R | L | D | U |
| Three-wire handshake | 0 | 0 | 0 | 1 | 0 | 0 | 0 | 1 |
| Clocked serial | 0 | 0 | 1 | 0 | 0 | 0 | 1 | 0 |
| Clocked parallel | 0 | 0 | 1 | 1 | 0 | 0 | 1 | 1 |

In this access subroutine, the CPU core 31 of the sub CPU 25 first determines communication modes by a series of Steps S201 to S203 on the basis of the logical values of data D and U acquired before. When both the data D is "0" and U is "1" (YES at Step S201), the peripheral device is identified as in the three-wire handshake mode (refer to Table 4), and the processing by the sub CPU 25 proceeds to a three-wire handshake-type access subroutine (Step S204).

When the data D and U are not "0" and "1", respectively (NO at Step S201), the CPU core 31 then determines whether both of the data D and U are "1" and "0", respectively, for example (Step S202). When the determination is YES at Step S202 (i.e., D="1" and U="0", refer to Table 3), the CPU core 31 continues to an access subroutine of the clocked serial communication mode (Step S205).

Furthermore, where the determination is NO at Step S202 (i.e., data D is not "1" and data U is not "0"), the CPU core 31 determines whether or not the data D is "1" and data U is "1" (Step S203). When being determined that D="1" and U="1" (YES at Step S203, refer to Table 4), the CPU core 31 performs an access subroutine of the clocked parallel communication mode (Step S206).

When the CPU core cannot find the positive answers at any of the above determination processes at Steps S201 to S203 (NO at Steps S201 to S203), It is then determined that any peripheral device be not connected to the apparatus 2 (Step S207), and this subroutine is ended up.

Each access subroutine shown at the above Steps S204 to S206 will now be explained in detail.

Figure 10:
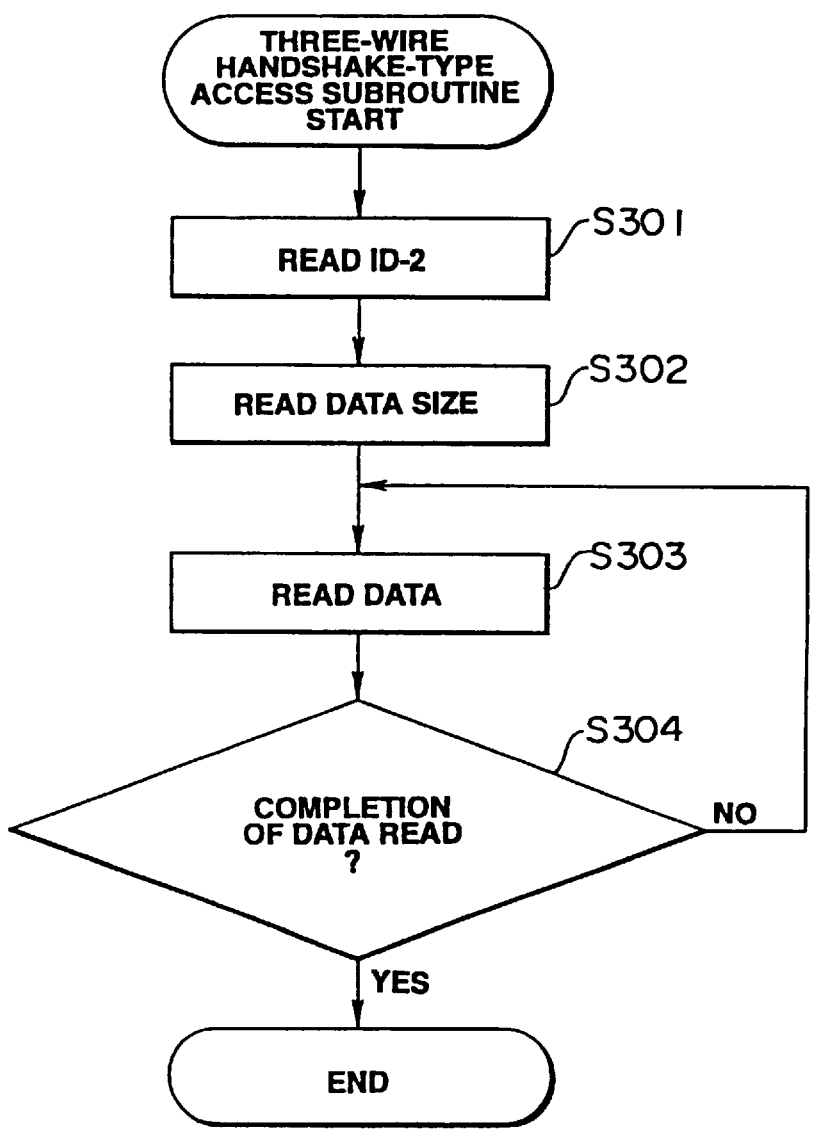
FIG. 10 shows a flowchart of an access subroutine for a three-wire handshake type of communication mode.

First, the access subroutine of the three-wire handshake communication mode, which is shown in FIG. 10, will be explained using the timing chart of each signal shown in FIG. 13 in which the reference t shows time.

Figure 13:
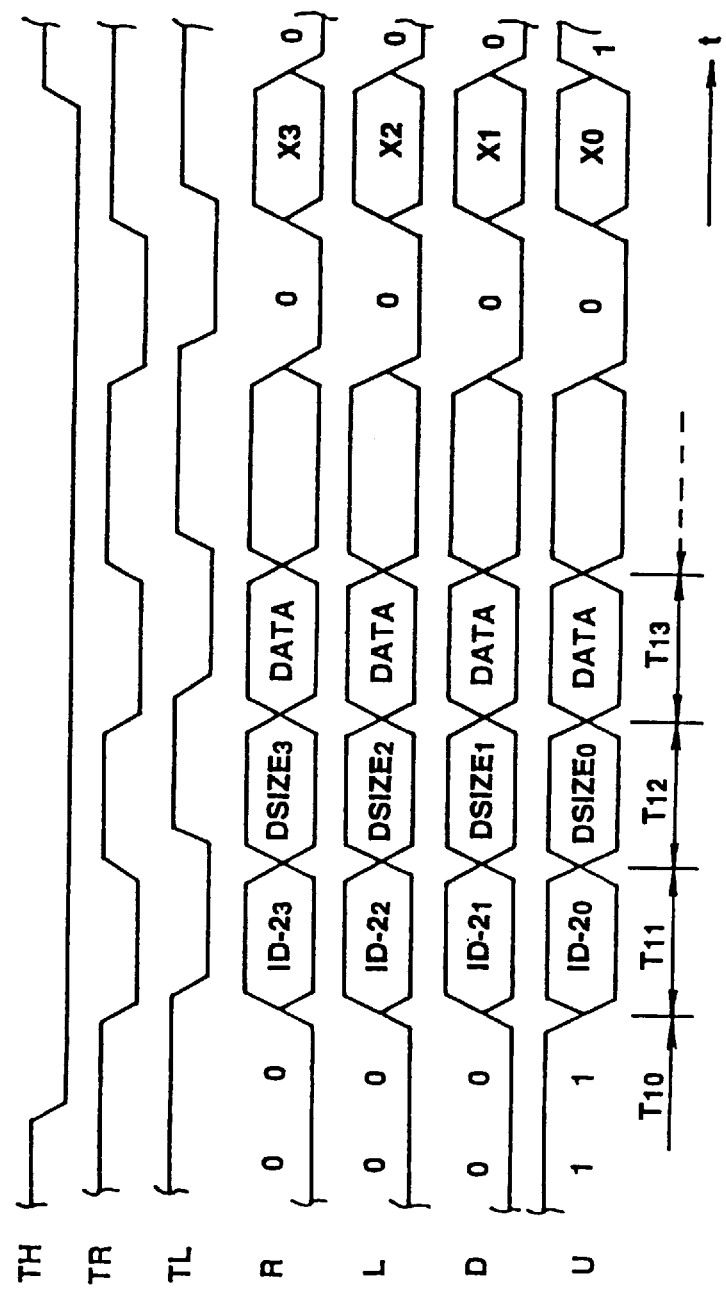
FIG. 13 represents a timing chart of control signals and data for the three-wire handshake type of communication mode.

During the interval $T_{11}$ in FIG. 13, the CPU core 31 reads the "peripheral ID-2" (Step S301 in FIG. 10). In other words, the data ID-$2_3$, ID-$2_2$, ID-$2_1$ and ID-$2_0$ of R, L, D and U are taken in by the CPU core 31 during the interval $T_{11}$ and it is determined whether each of those data ID-$2_3$ to ID-$2_0$ corresponds to any of "0h" to "Fh" (refer to IDs shown in Table 5).

TABLE 5

| Peripheral Device | ID-2 | Remarks |
| --- | --- | --- |
| Digital device | 0 | Control PAD, joystick etc. |
| Analog device | 1 | Analog joystick etc. |
| Pointing device | 2 | Mouse, tablet etc. |
| Keyboard | 3 | Keyboard etc. |
| Multitap | 4 | Multitap etc. |
|  | 5 |  |
|  | 6 |  |
|  | 7 |  |
|  | 8 |  |
|  | 9 |  |
|  | A |  |
|  | B |  |
|  | C |  |
|  | D |  |
| Peripheral #2 | E | ID for conversion |
|  | F | for non-connection |

In addition to the reading, the CPU core 31 looks up Table 5 for each value of the read peripheral ID-2. For example, the CPU core 31 determines that the peripheral device be a digital device for "peripheral ID-2"=0h, an analog device for "peripheral ID-2"=1h, a pointing device for "peripheral ID-2"=2h, a key board for "peripheral ID-2"=3h, and so on.

After such determination, the CPU core 31 reads the data size during the next interval $T_{12}$ (Step S302). Namely, as shown in FIG. 13, data DSIZE0 to DSIZE3 of R, L, D and U are taken in for deciding the data size.

Figure 12:
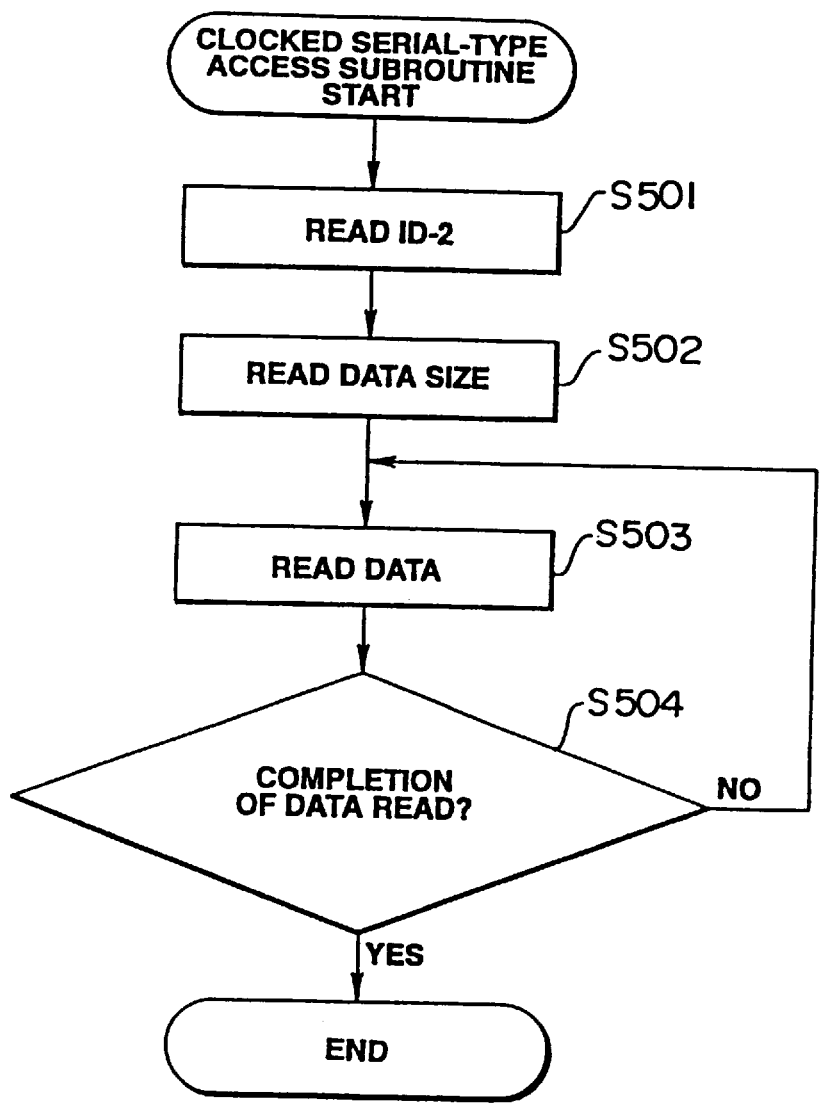
FIG. 12 is a flowchart of an access subroutine for a clocked serial type of communication mode.

The CPU core 31 then reads the data during the following intervals starting from interval $T_{13}$ in FIG. 12 (Step S303). It is then determined whether the amount of the read data reaches the data size (Step S304). If the determination is NO, the processing returns to Step S303 to read the data again. However, the determination is YES at Step S304 (i.e., the data amount that has been read by then reaches the determined data size), this subroutine is ended up.

Further, the access subroutine of the clocked parallel communication mode recited in FIG. 9 will now be explained using FIGS. 11 and 14.

Figure 14:
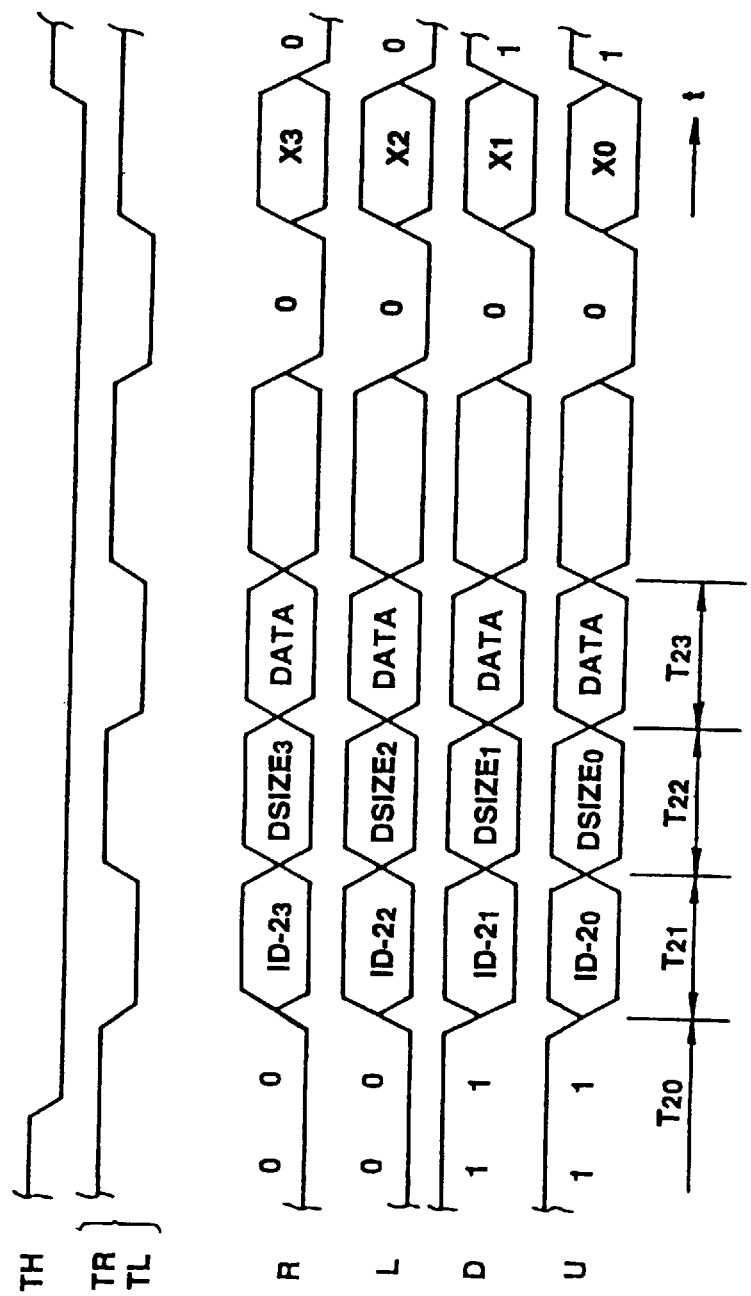
FIG. 14 represent a timing chart of control signals and data for the clocked parallel type of communication mode.

FIG. 14 shows the timing chart of the clocked parallel communication mode, which is almost the same as that shown in FIG. 13. Only one difference is that both of the signals TR and TL always change at the same timing, because of the short-circuit of pin nos. 5 and 6 in the plug connector 4ap (4bp).

Figure 11:
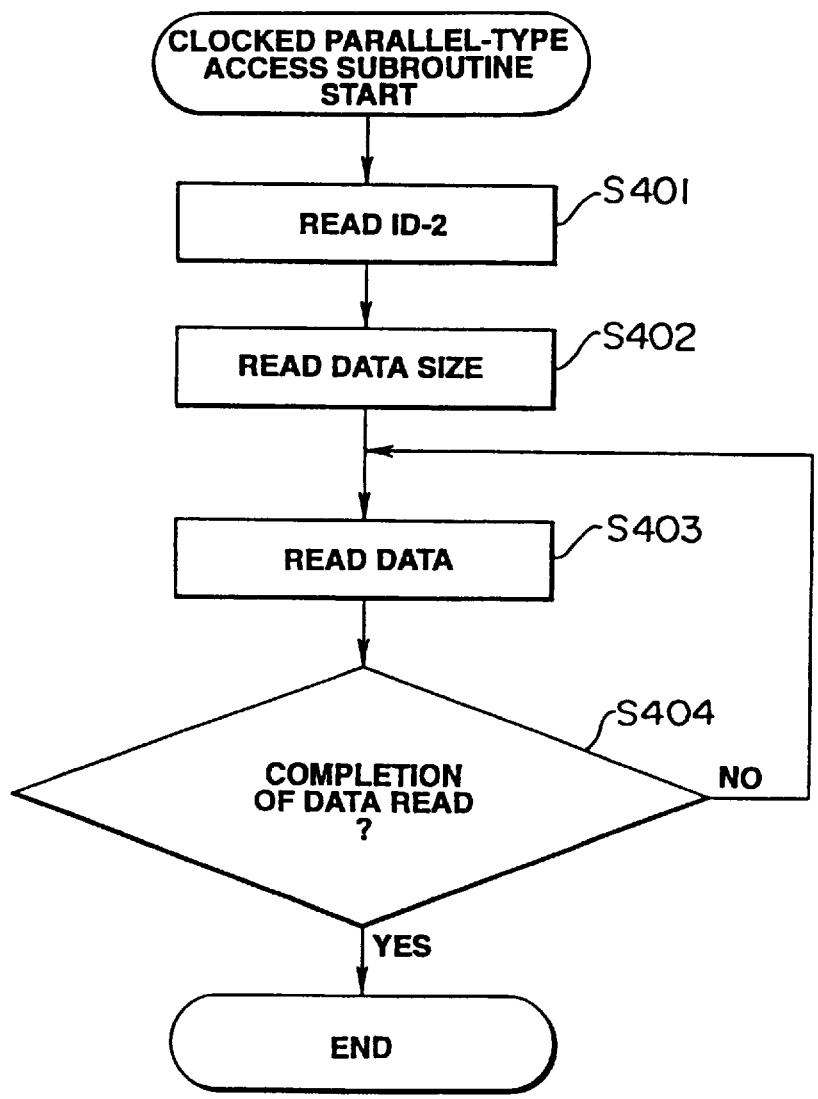
FIG. 11 shows a flowchart of an access subroutine for a clocked parallel type of communication mode.

First, the CPU core 31 reads the "peripheral ID-2" during the Interval $T_{21}$ in FIG. 14 (Step S401 in FIG. 11).

In detail, the data ID-$2_3$, ID-$2_2$, ID-$2_1$ and ID-$2_0$ of R, L, D and U are taken in by the CPU core 31 during the interval $T_{21}$ and it is determined whether each of the data ID-$2_3$ to ID-$2_0$ corresponds to any of "0h" to "Fh" (refer to IDs shown in Table 5). The CPU core 31 looks up Table 5 for each value of the read peripheral ID-2. For example, the CPU core 31 determines that the peripheral device be a digital device for "peripheral ID-2"=0h, an analog device for "peripheral ID-2"=1h, a pointing device for "peripheral ID-2"=2h, a key board for "peripheral ID-2"=3h, and so on.

After this, during the next interval $T_{22}$, the CPU core 31 reads the data size by receiving data DSIZE0 to DSIZE3 of R, L, D, U as shown in FIG. 14 (Step S402 in FIG. 11).

The CPU core 31 then reads the data during the following intervals starting from interval $T_{23}$ in FIG. 14 (Step S403). It is then determined whether the amount of the read data reaches the data size (Step S404). If the determination is NO, the processing returns to Step S403 to read the data again. However, the determination is YES at Step S404 (i.e., the data amount that has been read by then reaches the determined data size), this subroutine is ended up.

Figure 15:
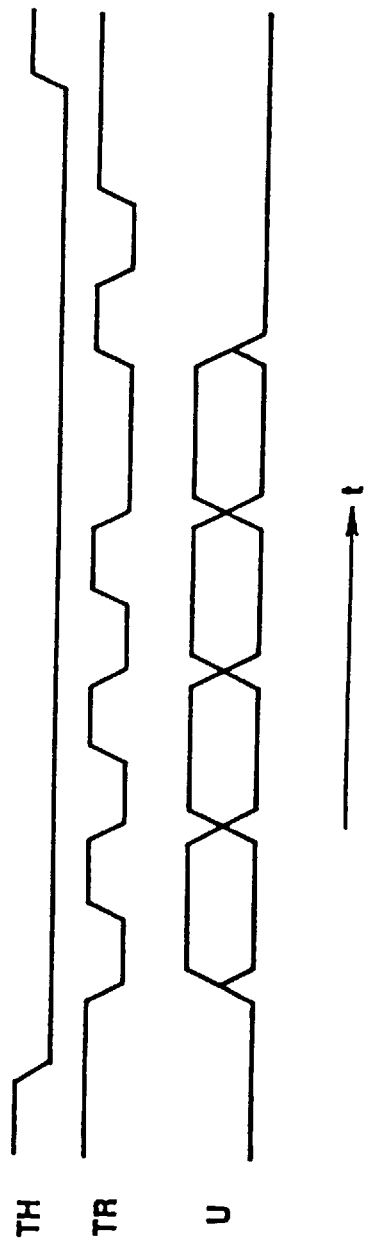
FIG. 15 is a timing chart of control signals and data for the clocked serial type of communication mode.

Further, the access subroutine of the clocked serial communication mode will be explained according to FIGS. 12 and 15 and Table 6. FIG. 15 exemplifies signal changes for the clocked serial mode, where the logical values of only the signals TH, TR and U are expressed along the elapsed time t.

This communication mode enables to obtain the data U only supplied from a peripheral device when the peripheral selection signal TH is "0" and at the same time, the data request signal TR is repeatedly "1" and "0", both the signals TH and TR being given to the device from the CPU core 31. The obtained data are exemplified in Table 6.

TABLE 6

| TH (input) | TR (input) | TL (GND) | R (GND) | L (GND) | D (Vcc) | U (DATA) | Remarks |
| --- | --- | --- | --- | --- | --- | --- | --- |
| 1 | 1 | 0 | 0 | 0 | 1 | 0 | ID-1(1st) |
| 0 | 1 | 0 | 0 | 0 | 1 | 0 | ID-2(2nd) |
| 0 | ↓ ↑ | 0 | 0 | 0 | 1 | $SMD_3$ |  |
| 0 | ↓ ↑ | 0 | 0 | 0 | 1 | $SMD_2$ |  |
| 0 | ↓ ↑ | 0 | 0 | 0 | 1 | $SMD_1$ |  |
| 0 | ↓ ↑ | 0 | 0 | 0 | 1 | $SMD_0$ |  |
| 0 | ↓ ↑ | 0 | 0 | 0 | 1 | ID-$2_3$ |  |
| 0 | ↓ ↑ | 0 | 0 | 0 | 1 | ID-$2_2$ |  |
| 0 | ↓ ↑ | 0 | 0 | 0 | 1 | ID-$2_1$ |  |
| 0 | ↓ ↑ | 0 | 0 | 0 | 1 | ID-$2_0$ |  |
| 0 | ↓ ↑ | 0 | 0 | 0 | 1 | $DSIZE_3$ |  |
| 0 | ↓ ↑ | 0 | 0 | 0 | 1 | $DSIZE_2$ |  |
| 0 | ↓ ↑ | 0 | 0 | 0 | 1 | $DSIZE_1$ |  |
| 0 | ↓ ↑ | 0 | 0 | 0 | 1 | $DSIZE_0$ |  |
| 0 | ↓ ↑ | 0 | 0 | 0 | 1 | $DATA_7$ |  |
| . | . | . | . | . | . | . |  |
| . | . | . | . | . | . | . |  |
| . | . | . | . | . | . | . |  |

TABLE 6-continued

| TH (input) | TR (input) | TL (GND) | R (GND) | L (GND) | D (Vcc) | U (DATA) | Remarks |
|---|---|---|---|---|---|---|---|
| 0 | ↓ ↑ | 0 | 0 | 0 | 1 | $DATA_0$ | |
| 0 | ↓ ↑ | 0 | 0 | 0 | 1 | CCB | |
| 0 | ↓ ↑ | 0 | 0 | 0 | 1 | 1 | |
| 0 | ↓ ↑ | 0 | 0 | 0 | 1 | 1 | |
| 0 | ↓ ↑ | 0 | 0 | 0 | 1 | 0 | |
| 1 | 1 | 0 | 0 | 0 | 1 | 0 | End M5ID-1st |

As shown in Table 6, only when the peripheral selection signal TH is "0", the data request signal TR is repeated at cycles of "1" and "0" (expressed by upward and downward arrows in Table 6), the signal TL and data R and L are all "0", and the data D is "1", various data U including $SMD_3$ to $SMD_0$, $ID-2_3$ to $ID-2_0$, $DSIZE_3$ to $DSIZE_0$, and $DATA_7$ to $DATA_0$ are provided in sequence from the line U through the pin 3. Those data are read by the CPU core 31. Among them, the bit pattern of the data $ID-2_3$ to $ID-2_0$ are referred to the table 5 to decide the type of a connected peripheral device (Step S501 in FIG. 12).

The CPU core 31 reads the data size expressed by $DSIZE_0$ to $DSIZE_3$ (Step S502), so that the data size can be determined.

The data are then received by the CPU core 31 during predetermined intervals in a time sequence shown in FIG. 15 (Step S503). The amount of the read data are referred to the determined data size to determine whether the amount reaches the data size (Step S504). If the determination is NO, the processing returns to Step S503 to repeat the foregoing data read. The determination of YES at Step S504 allows to end up this subroutine.

As having been explained, the CPU core 31 exchanges signals with peripheral devices such that data "DATA" are inputted after information of "peripheral ID-1", "peripheral ID-2" and data size "DSIZE".

When the data are inputted into the CPU core 31, the CPU core 31 is to exchange data with the main CPU 21 through the register table 34.

In the above embodiment, although the sub CPU 25 controls the peripheral devices, the main CPU 21 can also perform the above-described processing instead of the sub CPU 25, if the main CPU 21 is directly connected to the peripheral devices.

Further, another identifying method of a communication mode can be used in the present invention. As is described above, the control signals TR and TL are equal in logical values (TR=TL) in the clocked parallel communication mode and the logical values on only specified pins (D, TL, R, L) are changed in specific manners. In case of the three-wire handshake mode, the control signals TR and TL are changed differently. This enables to calculate identification data of peripheral devices based on the pin configurations of the connectors and decide communication modes using the identification data.

Although the present invention has been described with reference to particular embodiments, the description is only an example of the invention's application and should not be taken as a limitation. In particular, the connector, the communication mode identifying system, and the peripheral device controlling system of the present invention is not limited to use with the game apparatus and can also be applied to any other system which use a processing unit and at least one peripheral device thereof.

We claim:

1. A game apparatus comprising:

a main CPU;

a sub-CPU functionally connected with said main CPU;

a peripheral device which supplies various data including manipulation data;

an I/O interface connected to said peripheral device, said interface including a plurality of first lines, a second line and a third line;

said sub-CPU comprising:
identification data collection means for collecting a data set on said first lines when a first control signal of TH="1" and "0" is supplied to said peripheral device via said second line while the third line is maintained to "1";
peripheral device identification means for identifying the type of the peripheral device based on the identification data obtained by calculation with the following formula:

{(data R when TH is "1") or (data L when TH is "1")}×8h+{(data D when TH is "1") or (data U when TH is "2")} is 4h+{(data R when TH is "0") or (data L when TH is "0")}×2h+{(data D when TH is "0") or (data U when TH is "0")}×1h wherein data R, L, D and U represents data collected on each of said first lines, respectively, data TH represents the first control signal, and the suffix h represents a hexadecimal number when "1" and "0" correspond to a power source and ground potentials, respectively; and manipulation data collecting means formed so as to communicate with a peripheral device in one of a plurality of communication modes, said manipulation data collecting means comprising means for determining the communication mode of the peripheral device and means for collecting manipulation data supplied from the peripheral device via at least one of said first lines with one of the communication modes determined when said sub-CPU supplies a second control signal via said second line.

2. A peripheral device for use with a game system comprising a peripheral port with a port connector for receiving a connector of the peripheral device, said port connector having a plurality of first terminal contacts, a second terminal contact and a third terminal contact, an identification data collector configured to collect a data set on said first terminal contacts when a first control signal of TH="1" and "0" is supplied to the peripheral device via said second terminal contact while the third terminal contact is maintained to "1", a peripheral device processor configured to identify the type of the peripheral device based on the identification data obtained by calculation with the following formula:

{(data R when TH is "1") or (data L when TH is "1")}×8h+{(data D when TH is "1") or (data U when TH is "1")}×4h+{(data R when TH is "0") or (data L when TH is "0")}×2h+{(data D when TH is "0") or (data U when TH is "0")}×1h wherein R, L, D and U data represents data collected on each of the first terminal contacts, respectively, data TH represents a first control signal, and the suffix h represents a hexadecimal number, and a manipulation data collector configured to communicate with the peripheral device in one of a plurality of communication modes, said manipulation data collector comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact, wherein "1" and "0" correspond to a power source and ground potentials, respectively, said peripheral device comprising:

a data generator that supplies said game device via said plurality of first terminal contacts with a data combination representing the communication mode of the peripheral device in response to a control signal supplied from said game device via said second and third terminal contacts.

3. A peripheral device for use with a game system comprising a peripheral port with a port connector for receiving a connector of the peripheral device, said port connector having a plurality of first terminal contacts, a second terminal contact and a third terminal contact, an identification data collector configured to collect a data set on said first terminal contacts when a first control signal of TH="1" and "0" is supplied to the peripheral device via said second terminal contact while the third terminal contact is maintained to "1", a peripheral device processor configured to identify the type of the peripheral device based on the identification data obtained by calculation with the following formula:

{(data R when TH is "1") or (data L when TH is "1")}×8h+{(data D when TH is "1") or (data U when TH is "1")}×4h+{(data R when TH is "0") or (data L when TH is "0")}×2h+{(data D when TH is "0") or (data U when TH is "0")}×1h wherein R, L, D and U data represents data collected on each of the first terminal contacts, respectively, data TH represents a first control signal, and the suffix h represents a hexadecimal number, and a manipulation data collector configured to communicate with the peripheral device in one of a plurality of communication modes, said manipulation data collector comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact, wherein "1" and "0" correspond to a power source and ground potentials, respectively, said peripheral device comprising:

a data generator which supplies said game device via said plurality of first terminal contacts with a data combination which causes said formula to be a calculation result of Bh in response to a control signal of TH="1" and "0" supplied from said game device via said second terminal contact while the third terminal contact is maintained to "1".

4. A peripheral device according to claim 3, wherein the peripheral device comprises a plurality of key switches to be manually operated, said data generator supplying said game device via four of said first terminal contacts with:

a first data combination of data representing one of the key switches, "1", "0", and "0" in response to a control signal of TH="1" via said second terminal contact while the third terminal contact is maintained to "1", a second data combination of data representing a "RIGHT" key switch, a "LEFT" key switch, a "DOWN" key switch, and a "UP" key switch in response to a control signal of TH="0" via said second terminal contact while the third terminal contact is maintained to "1", and a third and a fourth data combinations of data representing remaining ones of said plurality of key switches other than said one of the key switches, and said "RIGHT", "LEFT", "DOWN" and "UP" key switches in response to a third control signal of TH="1" and a fourth control signal of TH="0" via said second terminal contact while the third terminal contact is maintained to "0".

5. The peripheral device of any one of claims 1–3, characterized in that the peripheral device comprises a plurality of switching keys disposed thereon to be manually operated by a player.

6. A peripheral device for use with a game system comprising a peripheral port with a port connector for receiving a connector of the peripheral device, said port connector having a plurality of first terminal contacts, a second terminal contact and a third terminal contact, an identification data collector configured to collect a data set on said first terminal contacts when a first control signal of TH="1" and "0" is supplied to the peripheral device via said second terminal contact while the third terminal contact is maintained to "1", a peripheral device processor configured to identify the type of the peripheral device based on the identification data obtained by calculation with the following formula:

{(data R when TH is "1") or (data L when TH is "1")}×8h+{(data D when TH is "1") or (data U when TH is "1")}×4h+{(data R when TH is "0") or (data L when TH is "0")}×2h+{(data D when TH is "0") or (data U when TH is "0")}×1h wherein R, L, D and U data represents data collected on each of the first terminal contacts, respectively, data TH represents a first control signal, and the suffix h represents a hexadecimal number, and a manipulation data collector configured to communicate with the peripheral device in one of a plurality of communication modes, said manipulation data collector comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact, wherein "1" and "0" correspond to a power source and ground potentials, respectively, said peripheral device comprising:

a data generator which supplies said game device via said plurality of first terminal contacts with a data combination which causes said formula to be a calculation result of 5h in response to a control signal of TH="1" and "0" supplied from said game device via said second terminal contact while the third terminal contact is maintained to "1".

7. The peripheral device according to claim 6, further comprising a plurality of key switches to be manually operated, said data generator supplying said game device with:
   a first data combination of "0", "0", "0" and "1" via four of said first terminal contacts in response to a first control signal of TH="1" and "0" supplied from said game device via said second terminal contact while the third terminal contact is maintained to "1",
   a second data combination representing said plurality of key switches via four of said first terminal contacts in response to a second control signal including a peripheral selection signal TH="0" supplied via said second terminal contact and a data request signal TR supplied via said third terminal contact, and
   an acknowledgment signal TL via a fourth terminal contact of said port connector in response to said second control signal.

8. The peripheral device according to claim 6, further comprising a plurality of key switches to be manually operated, said data generator supplying said game device with:
   a first data combination of "0", "0", "1" and "1" via four of said first terminal contacts in response to a first control signal of TH="1" and "0" supplied from said game device via said second terminal contact while the third terminal contact is maintained to "1", and
   a second data combination representing said plurality of key switches via four of said first terminal contacts in response to a second control signal including a peripheral selection signal TH="0" supplied via said second terminal contact and a clock signal TR supplied via said third terminal contact.

9. The peripheral device according to claim 6, further comprising a plurality of key switches to be manually operated, said data generator supplying said game device with:
   a first data combination of "0", "0", "1" and "0" via four of said first terminal contacts in response to a first control signal of TH="1" and "0" supplied from said game device via said second terminal contact while the third terminal contact is maintained to "1", and
   a second data combination representing said plurality of key switches via one of said first terminal contacts in response to a second control signal including a peripheral selection signal TH="0" supplied via said second terminal contact and a clock signal TR supplied via said third terminal contact.

10. A game system comprising:
    a peripheral device; and
    a game device, comprising:
       a peripheral port with a port connector for receiving a connector of the peripheral device, said port connector having a plurality of first terminal contacts, a second terminal contact and a third terminal contact;
       identification data collection means for collecting a data set of said first terminal contacts when a first control signal of TH="1" and "0" is supplied to the peripheral device via said second terminal contact while the third terminal contact is maintained to "1";
       peripheral device identification means for identifying the type of the peripheral device based on the identification data obtained by calculation with the following formula:

{(data R when TH is "1") or (data L when TH is "1")}×8h+{(data D when TH is "1" or (Data U when TH is "1")}×4h+{(data R when TH is "0") or (data L when TH is "0")}×2h+{(data D when TH is "0") or (data U when TH is "0")}×1h wherein R, L, D and U data represents data collected on each of the first terminal contacts, respectively, data TH represents a first control signal, and the suffix h represents a hexadecimal number; and
   manipulation data collecting means formed so as to communicate with the peripheral device in one of a plurality of communication modes, said manipulation data collecting means comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact;
   wherein "1" and "0" correspond to a power source and ground potentials, respectively.

11. A game system according to claim 10, wherein the peripheral device comprises:
    peripheral identification data supplying means for supplying said game device via said first terminal contacts with a data combination of R, L, D and U data so as to cause said formula to be Bh in response to said first control signal of TH="1" and "0" supplied to the peripheral device via said second terminal contact while the third terminal contact is maintained to "1".

12. A game system according to claim 11, wherein the peripheral device further comprises:
    a plurality of key switches disposed thereon to be manually operated;
    said data combination of R, L, D and U being formed so as to include a first combination of data representing one of said plurality of key switches, "1", "0" and "0" in response to said first control signal of TH="1" and a second combination of data representing direction data for a right key switch, left key switch, down key switch, and up key switch of said plurality of key switches in response to said first control signal of TH="0".

13. A game system according to claim 12, wherein the peripheral device further comprises:
    manipulation data supplying means including means for further supplying said game device via said first terminal contacts with a third and a fourth data combination of R, L, D and U data representing remaining ones of said plurality of key switches other than the right, left, down and up key switches in response to a second control signal of TH="1" and "0" supplied via said second terminal contact while the third terminal contact is maintained to "0".

14. A game system according to claim 10, wherein the peripheral device comprises:
    peripheral identification data supplying means for supplying said game device via said first terminal contacts with a data combination of R, L, D and U data so as to cause said formula to be 5h in response to said first control signal of TH="1" and "0" supplied to the peripheral device via said second terminal contact while the third terminal contact is maintained to "1".

15. A game system according to claim 14, wherein said data combination of R, L, D and U data is of "0", "0" "0" and "1", and the peripheral device further comprises:

a plurality of key switches disposed thereon to be manually operated;

manipulation data supplying means for supplying said game device via said first terminal contacts in parallel with various sets of data including data indicative of status of the key switches in response to a second control signal including a peripheral selection signal TH="0" for selecting the peripheral device supplied via said second terminal contact and a data request signal TR supplied via said third terminal contact; and means for supplying an acknowledgement signal TL to said game device via a fourth terminal contact of the connector in response to said second control signal.

16. A game system according to claim 14, wherein the data combination of R, L, D and U data is of "0" "0", "1" and "1", and the peripheral device further comprises:

a plurality of key switches disposed thereon to be manually operated; and manipulation data supplying means for supplying said game device via said first terminal contacts in parallel with various sets of data including data indicative of status of the key switches in response to a second control signal including a peripheral selection signal TH="0" for selecting the peripheral device supplied via said second terminal contact and a data request signal TR supplied via said third terminal contact.

17. A game system according to claim 14, wherein the data combination of R, L, D and U data is of "0", "0", and "1" and "0", and the peripheral device further comprises:

a plurality of key switches disposed thereon to be manually operated; and manipulation data supplying means for supplying said game device via one of said first terminal contacts in serial with various sets of data including data indicative of status of the key switches in response to a second control signal including a peripheral selection signal TH="0" for selecting the peripheral device supplied via said second terminal contact and a data request signal TR supplied via said third terminal contact.

18. A device connector for connecting a peripheral device to a game device comprising a peripheral port with a port connector for receiving a connector of the peripheral device, said port connector having a plurality of first terminal contacts, a second terminal contact and a third terminal contact, an identification data collector configured to collect a data set on said first terminal contacts when a first control signal of TH="1" and "0" is supplied to the peripheral device via said second terminal contact while the third terminal contact is maintained to "1", a peripheral device processor configured to identify the type of the peripheral device based on the identification data obtained by calculation with the following formula:

$$\{(\text{data R when TH is "1"}) \text{ or } (\text{data L when TH is "1"})\} \times 8h + \{(\text{data D when TH is "1"}) \text{ or } (\text{data U when TH is "1"})\} \times 4h + \{(\text{data R when TH is "0"}) \text{ or } (\text{data L when TH is "0"})\} \times 2h + \{(\text{data D when TH is "0"}) \text{ or } (\text{data U when TH is "0"})\} \times 1h$$

wherein R, L, D and U data represents data collected on each of the first terminal contacts, respectively, data TH represents a first control signal, and the suffix h represents a hexadecimal number and a manipulation data collector configured to communicate with the peripheral device in one of a plurality of communication modes, said manipulation data collector comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact, wherein "1" and "0" correspond to a power source and ground potentials, respectively, said device connector comprising:

a plug connector detachably connectable to said port connector, said plug connector comprising a plurality of elongated terminal contacts disposed parallely in a row.

19. A device connector for connecting a peripheral device to a game device comprising a peripheral port with a port connector for receiving a connector of the peripheral device, said port connector having a plurality of first terminal contacts, a second terminal contact and a third terminal contact, an identification data collector configured to collect a data set on said first terminal contacts when a first control signal of TH="1" and "0" is supplied to the peripheral device via said second terminal contact while the third terminal contact is maintained to "1", a peripheral device processor configured to identify the type of the peripheral device based on the identification data obtained by calculation with the following formula:

$$\{(\text{data R when TH is "1"}) \text{ or } (\text{data L when TH is "1"})\} \times 8h + \{(\text{data D when TH is "1"}) \text{ or } (\text{data U when TH is "1"})\} \times 4h + \{(\text{data R when TH is "0"}) \text{ or } (\text{data L when TH is "0"})\} \times 2h + \{(\text{data D when TH is "0"}) \text{ or } (\text{data U when TH is "0"})\} \times 1h$$

wherein R, L, D and U data represents data collected on each of the first terminal contacts, respectively, data TH represents a first control signal, and the suffix h represents a hexadecimal number, and a manipulation data collector configured to communicate with the peripheral device in one of a plurality of communication modes said manipulation data collector comprising means for determining the communication mode of the peripheral device and means for collecting manipulation data supplied from the peripheral device via at least one of said first terminal contacts with one of the communication modes and means for collecting manipulation data supplied from the peripheral device via at least one of said first terminal contacts with one of the communication modes in response to a second control signal supplied to the peripheral device via said second terminal contact, wherein "1" and "0" correspond to a power source and ground potentials, respectively, wherein said port connector is formed with nine of said terminal contacts, and wherein said device connector comprises:

a plug connector detachably connectable to said port connector having first to ninth terminal pins disposed correspondingly to the nine terminal contacts of said port connector, the terminal pins of the plug connector being formed with elongated contacts disposed parallely in a row;

said first and ninth terminal pins of the plug connector being respectively for connecting to a power source and ground potential supplied from said game device, said second, third, seventh and eighth terminal pins of the plug connector being disposed correspondingly to said plurality of first terminal contacts of said port connector and conducting data signals supplied from the peripheral device which represent a communication mode of the peripheral device, and at least one of the second, third, seventh, and eighth terminal pins of the plug connector being disposed for conducting data signals representing a plurality of switching keys formed on said peripheral device, and said fourth and fifth pins of the plug connector being disposed correspondingly to said second and third terminal contacts of said port connector and conducting control signals from the game device to the peripheral device.

20. The device connector of claim 19, wherein the sixth terminal pin is for conducting a control signal supplied from the game device, and the second, third, seventh and eighth terminal pins are for conducting data signals representing a plurality of switching keys formed on said peripheral device from the peripheral device in a three-wire handshake communication mode.

21. The device connector of claim 19, comprising means for short-circuiting the fifth and sixth terminal pins of the plug connector together, said second, third, seventh and eighth terminal pins of the plug connector being disposed for conducting data signals representing a plurality of switching keys formed on said peripheral device from the peripheral device in a clocked parallel communication mode.

22. The device connector of claim 19, comprising means for short-circuiting the first and second terminal pins of the plug connector together and means for short-circuiting the sixth through ninth terminal pins of the plug connector together, said third terminal pin of the plug connector being disposed for conducting data signals representing a plurality of switching keys formed on said peripheral device from the peripheral device in a clocked serial communication mode.

23. The device connector of claim 19, characterized in that the fourth and fifth terminal pins are for conducting 2 bit data selecting signals supplied to the peripheral device from the processing apparatus.

24. The devise connector of claim 19, characterized in that a control signal is supplied through the fourth and fifth pins of the plug connector from the processing apparatus to the peripheral device.

* * * * *